United States Patent
Takayama et al.

(10) Patent No.: US 8,687,469 B1
(45) Date of Patent: Apr. 1, 2014

(54) METHOD FOR MANUFACTURING AN ELECTRONIC DEVICE INCLUDING A LIGHT ABSORPTION LAYER

(71) Applicants: TDK Corporation, Tokyo (JP); SAE Magnetics (H.K.) Ltd., Hong Kong (CN)

(72) Inventors: Seiichi Takayama, Tokyo (JP); Yasuhiro Ito, Tokyo (JP); Nobuyuki Mori, Tokyo (JP); Koji Shimazawa, Tokyo (JP); Kazuaki Takanuki, Tokyo (JP); Youichi Ando, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/708,593

(22) Filed: Dec. 7, 2012

(51) Int. Cl.
*G11B 11/00* (2006.01)

(52) U.S. Cl.
USPC .................................................. 369/13.24

(58) Field of Classification Search
USPC ........ 369/13.02, 13.24, 13.32, 13.33; 360/59; 29/603.07; 228/121
See application file for complete search history.

(56) References Cited

U.S. PATENT DOCUMENTS

| | | | |
|---|---|---|---|
| 8,149,653 B2* | 4/2012 | Shimazawa et al. | 369/13.33 |
| 2011/0096508 A1* | 4/2011 | Bita et al. | 361/728 |
| 2011/0228650 A1 | 9/2011 | Shimazawa et al. | |
| 2012/0073120 A1 | 3/2012 | Shimazawa et al. | |
| 2012/0090162 A1 | 4/2012 | Shimazawa et al. | |
| 2013/0234298 A1* | 9/2013 | Mitsugi et al. | 257/629 |

* cited by examiner

*Primary Examiner* — Brenda Bernardi

(74) *Attorney, Agent, or Firm* — Oliff PLC

(57) ABSTRACT

A method of manufacturing an electronic device includes a first bonding step of bonding an electronic component and a first member together via a first bonding layer and a second bonding step of bonding the first member and a second member together via a second bonding layer after the first bonding step. The second bonding layer includes a bonding material layer made of a bonding material. In the second bonding step, with the bonding material interposed between the first and second members before being bonded together, the bonding material is heated and melted using light traveling through the first member. The first member is made of Si. The light has a wavelength in the range of 1100 to 15000 nm.

26 Claims, 16 Drawing Sheets

METHOD FOR MANUFACTURING AN ELECTRONIC DEVICE INCLUDING A LIGHT ABSORPTION LAYER

BACKGROUND OF THE INVENTION

1. Field of the Invention

The present invention relates to a method of manufacturing an electronic device that includes the step of melting a bonding material with light.

2. Description of the Related Art

An electronic component such as a semiconductor element may be bonded to a first member, such as a substrate for supporting the electronic component, and thus unitized therewith for use. In this case, solder, for example, is used to bond the electronic component and the first member together. On the other hand, for an electronic device including an electronic component, a first member with the electronic component bonded thereto may be bonded to a second member. In this case also, solder, for example, is used to bond the first member and the second member together.

An example of electronic devices including the electronic component and the first and second members as mentioned above is a thermally-assisted magnetic recording head such as one disclosed in each of U.S. Patent Application Publication Nos. 2011/0228650 A1, 2012/0073120 A1, and 2012/0090162 A1.

The thermally-assisted magnetic recording heads disclosed in the above-listed three references each include a slider which slightly flies over the surface of a magnetic recording medium, and a light source unit. The slider has a waveguide through which light propagates. The light source unit includes a laser diode and a unit substrate for supporting the laser diode. The laser diode is bonded to the unit substrate via a first solder layer. The unit substrate is positioned so that emitted light from the laser diode will be incident on the incidence end face of the wave guide, and is bonded to the slider via a second solder layer. The laser diode, the unit substrate, and the slider of the thermally-assisted magnetic recording head correspond to the electronic component, the first member, and the second member mentioned above, respectively.

Each of the aforementioned three references discloses a method of manufacturing the thermally-assisted magnetic recording head in which the unit substrate with the laser diode already bonded thereto is positioned with respect to the slider and then bonded thereto. The references each further disclose a technology to heat and melt the second solder layer by applying laser light when bonding the unit substrate to the slider, such that the laser light passes through the unit substrate. The references list Si, GaAs, SiC, $Al_2O_3$—TiC, and $SiO_2$ as examples of the material of the unit substrate. The references further teach the use of Nd-YAG laser light having a wavelength of 1064 nm as the laser light for heating the second solder layer.

A problem with the above-described technology will now be discussed. According to the above-described technology, part of the laser light passing through the unit substrate is absorbed by the unit substrate and transformed into heat. The heat is conducted not only to the second solder layer which is intended to be melted but also to the first solder layer which is not intended to be melted. If the heat is conducted to the first solder layer in a large quantity, the first solder layer may be melted to cause a change in the position of the laser diode relative to the unit substrate.

This problem applies not only to the manufacture of a thermally-assisted magnetic recording head including a laser diode, a unit substrate and a slider but also generally to the manufacture of an electronic device including an electronic component, a first member and a second member.

OBJECTS AND SUMMARY OF THE INVENTION

It is a first object of the present invention to provide a method of manufacturing an electronic device including an electronic component, a first member supporting the electronic component, and a second member to which the first member is bonded, the method allowing prevention of a change in the position of the electronic component relative to the first member when the first member with the electronic component already bonded thereto is bonded to the second member by using light.

It is a second object of the present invention to provide an electronic device including an electronic component, a first member supporting the electronic component, and a second member to which the first member is bonded, the electronic device being configured to allow prevention of a change in the position of the electronic component relative to the first member in the process of manufacturing the electronic device.

An electronic device of a first mode to be manufactured by a manufacturing method of a first aspect of the present invention includes an electronic component, a first member supporting the electronic component, a second member to which the first member is bonded, a first bonding layer bonding the electronic component and the first member together, and a second bonding layer bonding the first member and the second member together. The first member has an outer surface, the outer surface including a first surface in contact with the first bonding layer, a second surface in contact with the second bonding layer, and a third surface in contact with neither of the first and second bonding layers. The first bonding layer includes a first bonding material layer made of a first bonding material that melts when heated to a first melting temperature or higher. The second bonding layer includes a second bonding material layer made of a second bonding material that melts when heated to a second melting temperature or higher.

The manufacturing method of the first aspect includes a first bonding step of bonding the electronic component and the first member together via the first bonding layer, and a second bonding step of bonding the first member and the second member together via the second bonding layer after the first bonding step. In the second bonding step, with a preliminary bonding layer interposed between the first member and the second member before being bonded together, the preliminary bonding layer including the second bonding material and being configured to later become the second bonding layer, the second bonding material included in the preliminary bonding layer is heated and melted by irradiation with light projected to travel through the first member from the third surface to the second surface, and thereafter the second bonding material is solidified so that the preliminary bonding layer becomes the second bonding layer. The first member is made of Si. The light has a wavelength in the range of 1100 to 15000 nm.

An electronic device of a second mode to be manufactured by a manufacturing method of a second aspect of the present invention includes an electronic component, a first member supporting the electronic component, a second member to which the first member is bonded, a first bonding layer bonding the electronic component and the first member together, and a second bonding layer bonding the first member and the second member together. The first member has an outer surface, the outer surface including a first surface in contact with the first bonding layer, a second surface in contact with the second bonding layer, and a third surface in contact with neither of the first and second bonding layers. The first bonding layer includes a first bonding material layer made of a first bonding material that melts when heated to a first melting temperature or higher. The second bonding layer includes a second bonding material layer made of a second bonding material that melts when heated to a second melting temperature or higher, and a light absorption layer interposed between the second surface and the second bonding material layer.

The manufacturing method of the second aspect includes a first bonding step of bonding the electronic component and the first member together via the first bonding layer, and a second bonding step of bonding the first member and the second member together via the second bonding layer after the first bonding step. In the second bonding step, with a preliminary bonding layer interposed between the first member and the second member before being bonded together, the preliminary bonding layer including the light absorption layer and the second bonding material and being configured to later become the second bonding layer, the second bonding material included in the preliminary bonding layer is heated and melted by irradiation with light projected to travel through the first member from the third surface to the second surface, and thereafter the second bonding material is solidified so that the preliminary bonding layer becomes the second bonding layer. The light absorption layer has a light absorption coefficient for the light higher than that of the first member.

In the manufacturing method of the second aspect, the second bonding layer may further include a metal layer interposed between the second bonding material layer and the light absorption layer.

In the manufacturing method of the second aspect, the first member may be made of Si and the light may have a wavelength in the range of 1100 to 15000 nm. Further, the light absorption coefficient of the light absorption layer for the light may be $1 \times 10^3$ cm$^{-1}$ or more. The light absorption layer may be made of a material containing Cu, In and Se.

In the manufacturing methods of the first and second aspects, the second melting temperature may be lower than the first melting temperature.

In the manufacturing methods of the first and second aspects, the electronic component may be a laser diode. In this case, the laser diode may have a first emission part for emitting forward light and a second emission part for emitting backward light. The electronic device may further include a photodetector integrated with the first member. The photodetector receives the backward light.

In the manufacturing methods of the first and second aspects, where the electronic component is a laser diode, the second member may have a waveguide configured to allow emitted light from the laser diode to be incident thereon. The second member may be a slider for thermally-assisted magnetic recording. The slider may include a medium facing surface facing a magnetic recording medium, a magnetic pole, a waveguide through which light propagates, and a plasmon generator. The magnetic pole has an end face located in the medium facing surface and produces a write magnetic field for writing data on the magnetic recording medium. The plasmon generator is configured to excite a surface plasmon based on the light propagating through the waveguide and to generate near-field light from the medium facing surface based on the surface plasmon. The waveguide is configured to allow emitted light from the laser diode to be incident thereon.

An electronic device of a third aspect of the present invention includes an electronic component, a first member supporting the electronic component, a second member to which the first member is bonded, a first bonding layer bonding the electronic component and the first member together, and a second bonding layer bonding the first member and the second member together. The first member has an outer surface, the outer surface including a first surface in contact with the first bonding layer, a second surface in contact with the second bonding layer, and a third surface in contact with neither of the first and second bonding layers. The first bonding layer includes a first bonding material layer made of a first bonding material that melts when heated to a first melting temperature or higher.

The second bonding layer includes a second bonding material layer made of a second bonding material that melts when heated to a second melting temperature or higher, and a light absorption layer interposed between the second surface and the second bonding material layer and absorbing light. The light absorption layer has a light absorption coefficient higher than that of the first member for light having a wavelength in the range of 1100 to 1220 nm.

In the electronic device of the third aspect, the second bonding layer may further include a metal layer interposed between the second bonding material layer and the light absorption layer.

In the electronic device of the third aspect, the first member may be made of Si. The light absorption coefficient of the light absorption layer may be $1 \times 10^3$ cm$^{-1}$ or more. The light absorption layer may be made of a material containing Cu, In and Se.

In the electronic device of the third aspect, the second melting temperature may be lower than the first melting temperature.

In the electronic device of the third aspect, the electronic component may be a laser diode. In this case, the laser diode may have a first emission part for emitting forward light and a second emission part for emitting backward light. The electronic device of the third aspect may further include a photodetector integrated with the first member. The photodetector receives the backward light.

In the electronic device of the third aspect, where the electronic component is a laser diode, the second member may have a waveguide configured to allow emitted light from the laser diode to be incident thereon. The second member may be a slider for thermally-assisted magnetic recording. The slider may include a medium facing surface facing a magnetic recording medium, a magnetic pole, a waveguide through which light propagates, and a plasmon generator. The magnetic pole has an end face located in the medium facing surface and produces a write magnetic field for writing data on the magnetic recording medium. The plasmon generator is configured to excite a surface plasmon based on the light propagating through the waveguide and to generate near-field light from the medium facing surface based on the surface plasmon. The waveguide is configured to allow emitted light from the laser diode to be incident thereon.

In the manufacturing method of the first aspect of the present invention, the first member is made of Si, and the light used to bond the first member and the second member together has a wavelength in the range of 1100 to 15000 nm. This makes it possible to utilize the energy of the light efficiently in heating the second bonding material. As a result, it is possible to prevent a change in the position of the electronic component relative to the first member when the first member with the electronic component already bonded thereto is bonded to the second member by using the light.

In the manufacturing method of the second aspect of the present invention, the second bonding layer includes the light absorption layer, and the light absorption layer has a light absorption coefficient higher than that of the first member for the light used to bond the first member and the second member together. This makes it possible to utilize the energy of the light efficiently in heating the second bonding material. As a result, it is possible to prevent a change in the position of the electronic component relative to the first member when the first member with the electronic component already bonded thereto is bonded to the second member by using the light.

In the electronic device of the third aspect of the present invention, the second bonding layer includes the light absorption layer, and the light absorption layer has a light absorption coefficient higher than that of the first member for light having a wavelength in the range of 1100 to 1220 nm. Consequently, at least when the second bonding material is heated using the light having a wavelength in the range of 1100 to 1220 nm in order to bond the first member and the second member together in the process of manufacturing the electronic device of the third aspect, it is possible to utilize the energy of the light efficiently in heating the second bonding material. Thus, according to the electronic device of the third aspect, it is possible to prevent a change in the position of the electronic component relative to the first member in the process of manufacturing the electronic device.

Other and further objects, features and advantages of the present invention will appear more fully from the following description.

DETAILED DESCRIPTION OF THE PREFERRED EMBODIMENTS

First Embodiment

Figure 1:
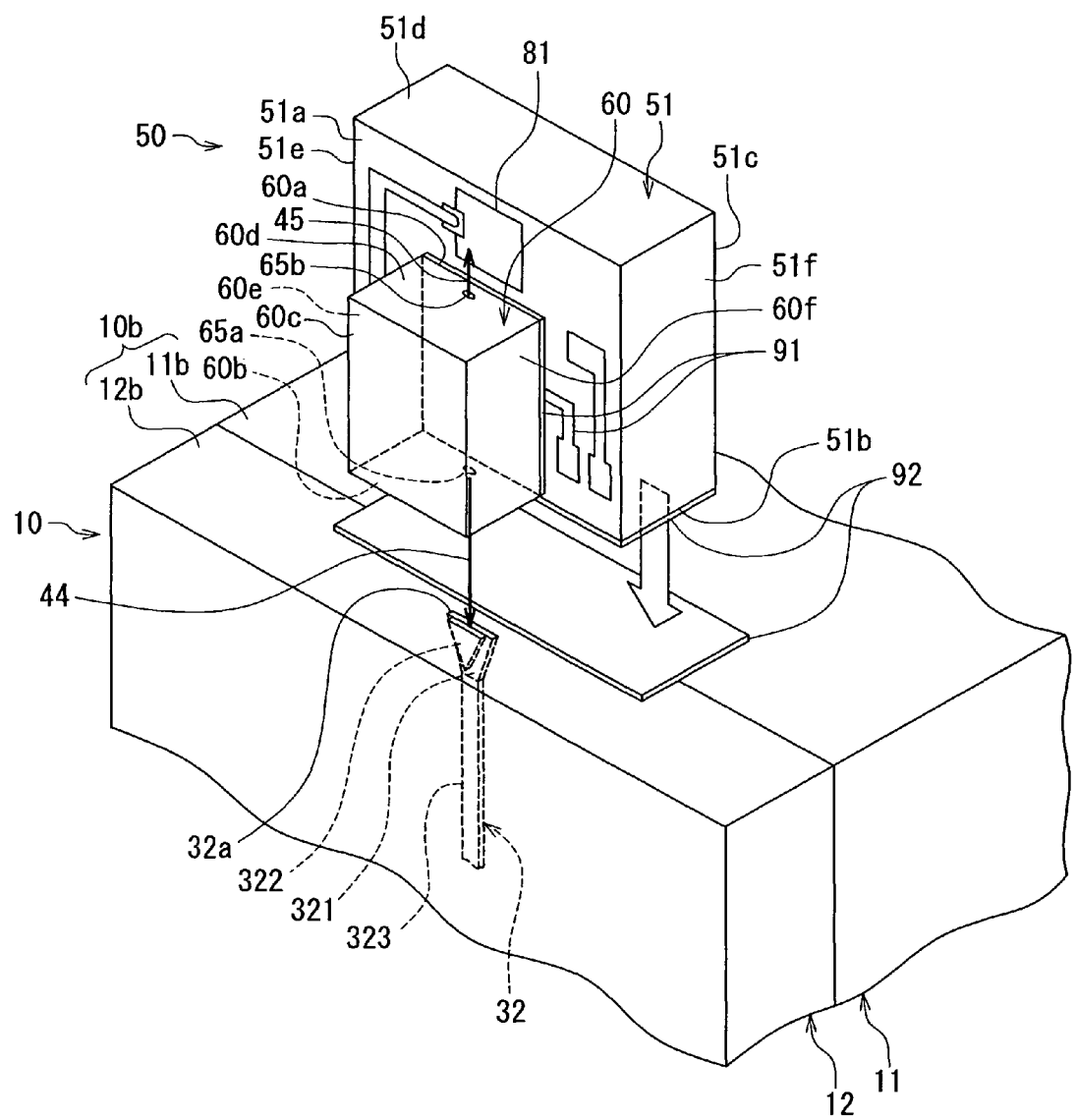
FIG. 1 is a perspective view showing the main part of an electronic device according to a first embodiment of the invention.
Figure 2:
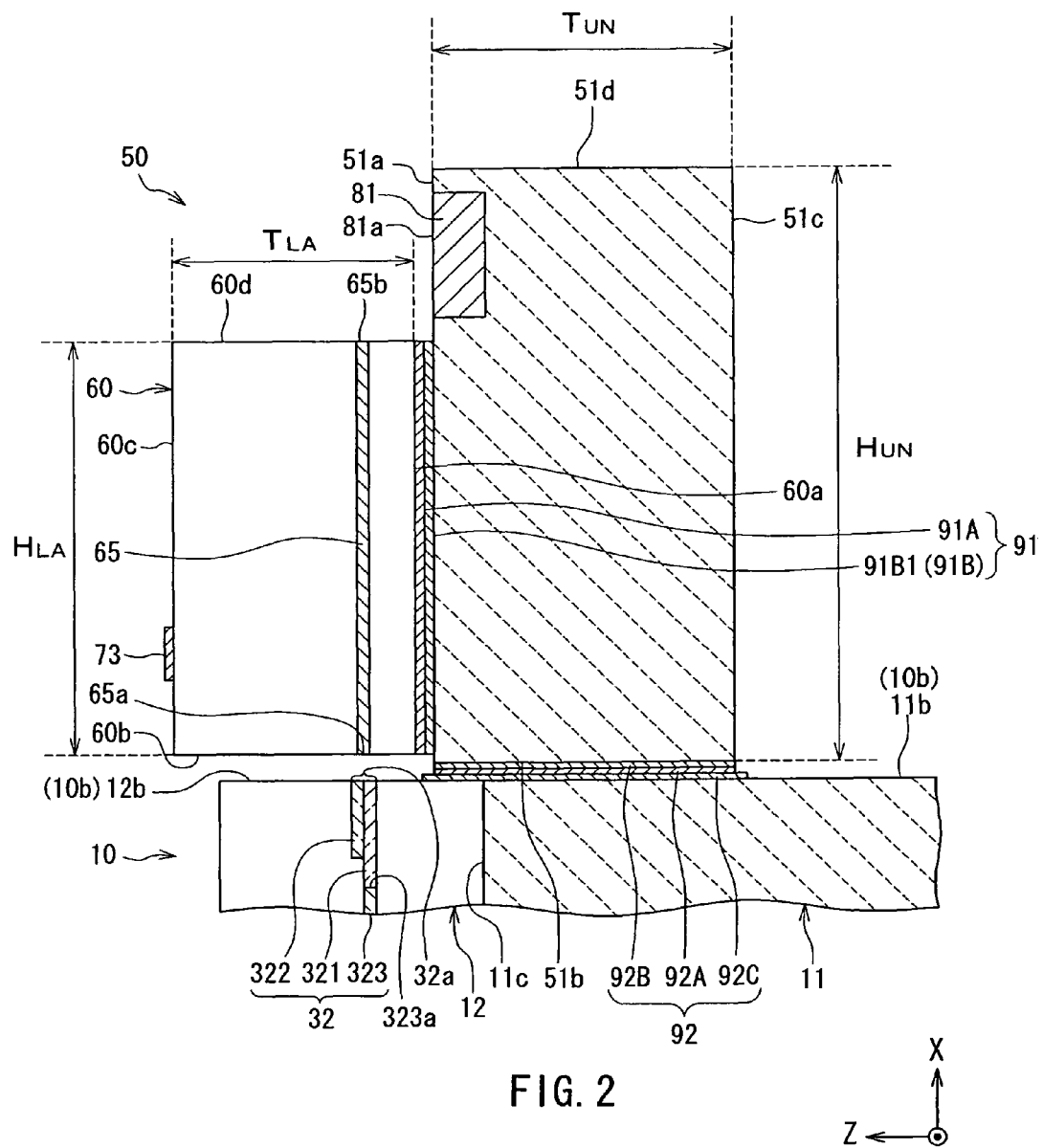
FIG. 2 is a cross-sectional view showing the main part of the electronic device according to the first embodiment of the invention.
Figure 3:
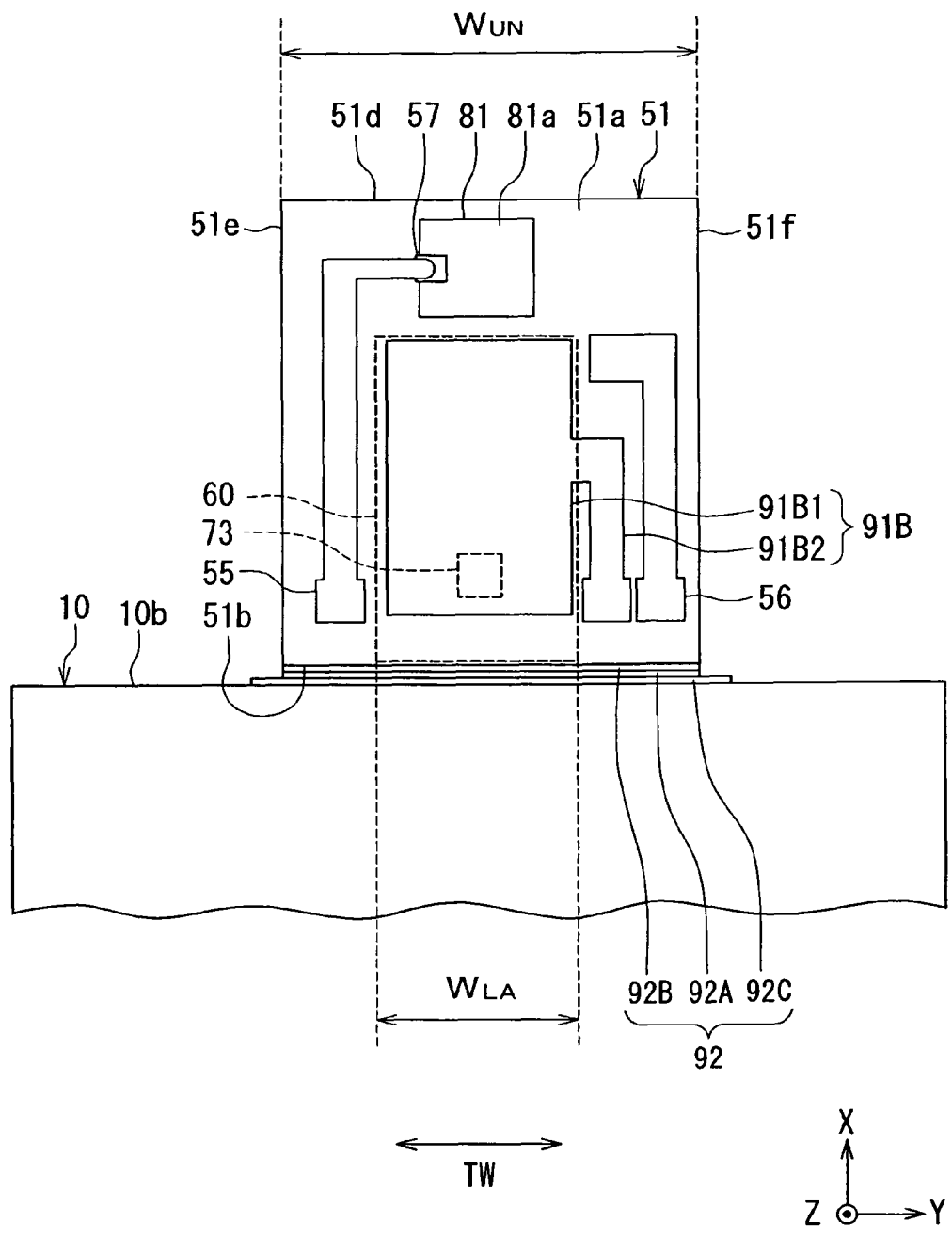
FIG. 3 is a plan view showing a first surface of a first member of the electronic device according to the first embodiment of the invention.

Preferred embodiments of the present invention will now be described in detail with reference to the drawings. First, with reference to FIG. 1 to FIG. 3, an electronic device according to a first embodiment of the invention will be described in outline. FIG. 1 is a perspective view showing the main part of the electronic device. FIG. 2 is a cross-sectional view showing the main part of the electronic device. FIG. 3 is a plan view showing a first surface of a first member of the electronic device. As shown in FIG. 1 to FIG. 3, the electronic device includes an electronic component 60, a first member 51 supporting the electronic component 60, a second member 10 to which the first member 51 is bonded, a first bonding layer 91 bonding the electronic component 60 and the first member 51 together, and a second bonding layer 92 bonding the first member 51 and the second member 10 together. FIG. 1 shows a state in which the first member 51 and the second member 10 are separated from each other.

In the present embodiment, as shown in FIG. 1, the electronic component 60 and the first member 51 are each generally rectangular-solid-shaped. The first member 51 has an outer surface, the outer surface including a first surface 51a in contact with the first bonding layer 91, a second surface 51b in contact with the second bonding layer 92, and a third surface in contact with neither of the first and second bonding layers 91 and 92. In the present embodiment, the first surface 51a and the second surface 51b are orthogonal to each other. The third surface includes a surface 51c opposite to the first surface 51a, a surface 51d opposite to the second surface 51b, and two surfaces 51e and 51f opposite to each other and connecting the surfaces 51a to 51d to each other.

The electronic component 60 has an outer surface, the outer surface including a bottom surface 60a, a front end face 60b, a top surface 60c opposite to the bottom surface 60a, a rear end face 60d opposite to the front end face 60b, and two side surfaces 60e and 60f opposite to each other and connecting the surfaces 60a to 60d to each other. The electronic component 60 is bonded to the first member 51 with the bottom surface 60a toward the first surface 51a of the first member 51 and the front end face 60b located near the ridge between the first surface 51a and the second surface 51b of the first member 51. When in the state in which the electronic component 60 is bonded to the first member 51, the bottom surface 60a and the top surface 60c are parallel to the first surface 51a while the front end face 60b and the rear end face 60d are parallel to the second surface 51b. The first bonding layer 91 is interposed between the first surface 51a and the bottom surface 60a.

The second member 10 has an outer surface, the outer surface including a rear surface 10b in contact with the second bonding layer 92. The first member 51 is bonded to the second member 10 with the second surface 51b of the first member 51 toward the rear surface 10b. When in the state in which the first member 51 is bonded to the second member 10, the first surface 51a is perpendicular to the rear surface 10b while the second surface 51b is parallel to the rear surface 10b. Further, when in this state, the front end face 60b of the electronic component 60 faces the rear surface 10b. The second bonding layer 92 is interposed between the second surface 51b and the rear surface 10b.

In the present embodiment, in particular, the electronic device is a thermally-assisted magnetic recording head, and the second member 10 is a slider for thermally-assisted magnetic recording. On the other hand, the electronic component 60 is a laser diode for generating laser light for thermally-assisted magnetic recording, and is bonded to the first member 51 and thereby unitized therewith for use. In the following descriptions, the second member 10 will be referred to as the slider 10, the electronic component 60 as the laser diode 60, and the first member 51 as the unit substrate 51. Further, the unit made up of the laser diode 60 and the unit substrate 51 will be referred to as the light source unit and denoted by reference numeral 50.

As shown in FIG. 1, the laser diode 60 has a first emission part 65a for emitting forward light 44 and a second emission part 65b for emitting backward light 45. The backward light 45 is emitted toward a direction opposite to the direction of the forward light 44. Both the forward light 44 and the backward light 45 are laser light. The front end face 60b includes the first emission part 65a. The rear end face 60d includes the second emission part 65b. As shown in FIG. 2, the distance between the bottom surface 60a and the first emission part 65a is smaller than the distance between the top surface 60c and the first emission part 65a, while the distance between the bottom surface 60a and the second emission part 65b is smaller than the distance between the top surface 60c and the second emission part 65b.

The slider 10 has a waveguide 32 configured to allow the forward light 44, which is part of the emitted light from the laser diode 60, to be incident thereon. The waveguide 32 has an incidence end 32a located on the rear surface 10b of the slider 10. The unit substrate 51 is bonded to the slider 10, being positioned with respect to the slider 10 so that the emitted light (the forward light 44) from the laser diode 60 will be incident on the incidence end 32a of the waveguide 32.

The electronic device further includes a photodetector 81 integrated with the unit substrate 51. The photodetector 81 has a light receiving surface 81a to receive the backward light 45 emitted from the second emission part 65b. The photodetector 81 is embedded in the unit substrate 51 such that the light receiving surface 81a is in the vicinity of the second emission part 65b of the laser diode 60 when in the state in which the laser diode 60 is bonded to the unit substrate 51.

Figure 4:
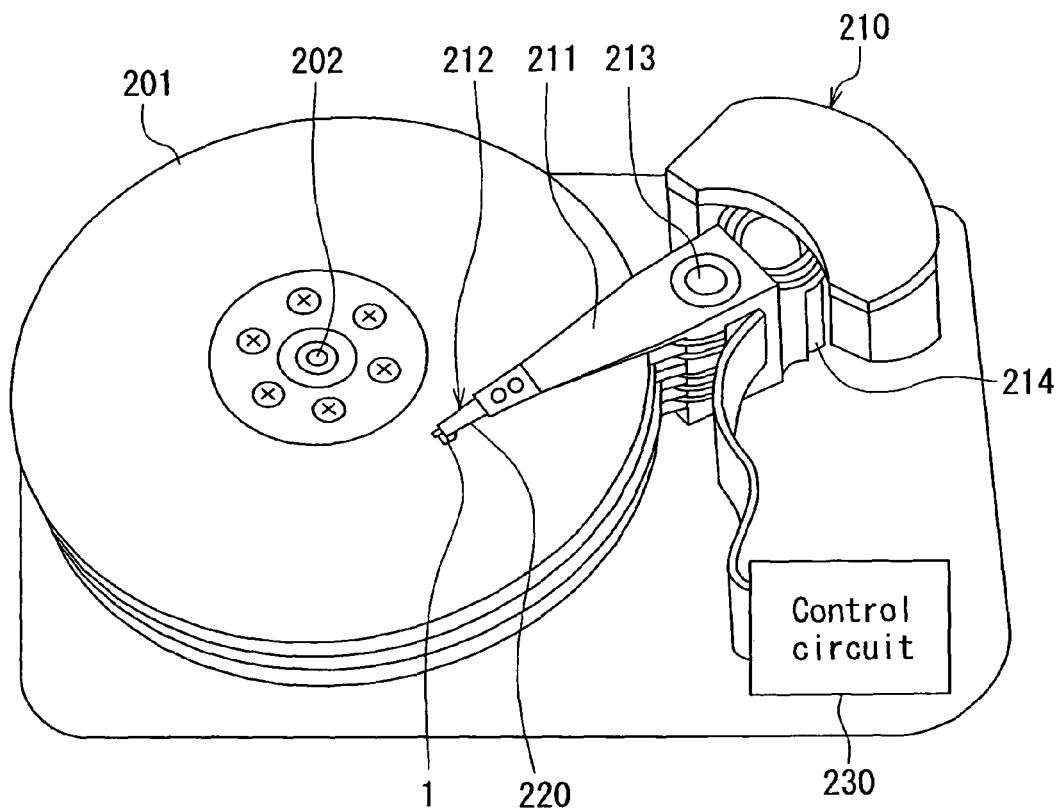
FIG. 4 is a perspective view showing a magnetic recording device of the first embodiment of the invention.

The electronic device according to the present embodiment will now be described in detail with reference to an example of the specific configuration of the thermally-assisted magnetic recording head. First, with reference to FIG. 4, a description will be given of a magnetic disk drive serving as a magnetic recording device that employs the thermally-assisted magnetic recording head of the present embodiment. As shown in FIG. 4, the magnetic disk drive includes a plurality of magnetic disks 201 as a plurality of magnetic recording media, and a spindle motor 202 for rotating the magnetic disks 201. The magnetic disks 201 of the present embodiment are for use in perpendicular magnetic recording. Each magnetic disk 201 has such a structure that a soft magnetic under layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 of the present embodiment, and a suspension 220 that supports the thermally-assisted magnetic recording head 1.

The assembly carriage device 210 is a device for positioning each thermally-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device is not structurally limited to the magnetic disk drive having the above-described configuration. For example, the magnetic recording device may be provided with a single magnetic disk 201, a single driving arm 211, a single head gimbal assembly 212 and a single thermally-assisted magnetic recording head 1.

The magnetic disk drive further includes a control circuit 230 that controls the read and write operations of the thermally-assisted magnetic recording heads 1 and also controls the light emitting operation of the laser diode 60. The control circuit 230 of the present embodiment has a particular function for controlling the intensity of the emitted light from the laser diode 60 on the basis of the detection result provided by the photodetector 81. According to the present embodiment, it is thus possible to stabilize the intensity of near-field light used for thermally-assisted magnetic recording, and to thereby allow the thermally-assisted magnetic recording head 1 to perform the write operation with stability.

Figure 5:
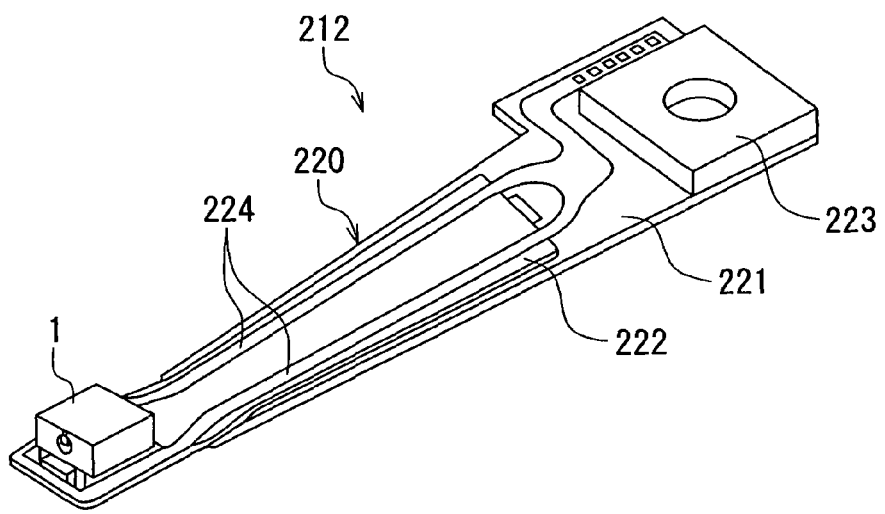
FIG. 5 is a perspective view showing a head gimbal assembly of the first embodiment of the invention.

FIG. 5 is a perspective view showing the head gimbal assembly 212 of FIG. 4. As previously described, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The head gimbal assembly is not limited to one having the configuration shown in FIG. 5. For example, the head gimbal assembly may have an IC chip for driving the head that is mounted somewhere along the suspension 220.

Figure 6:
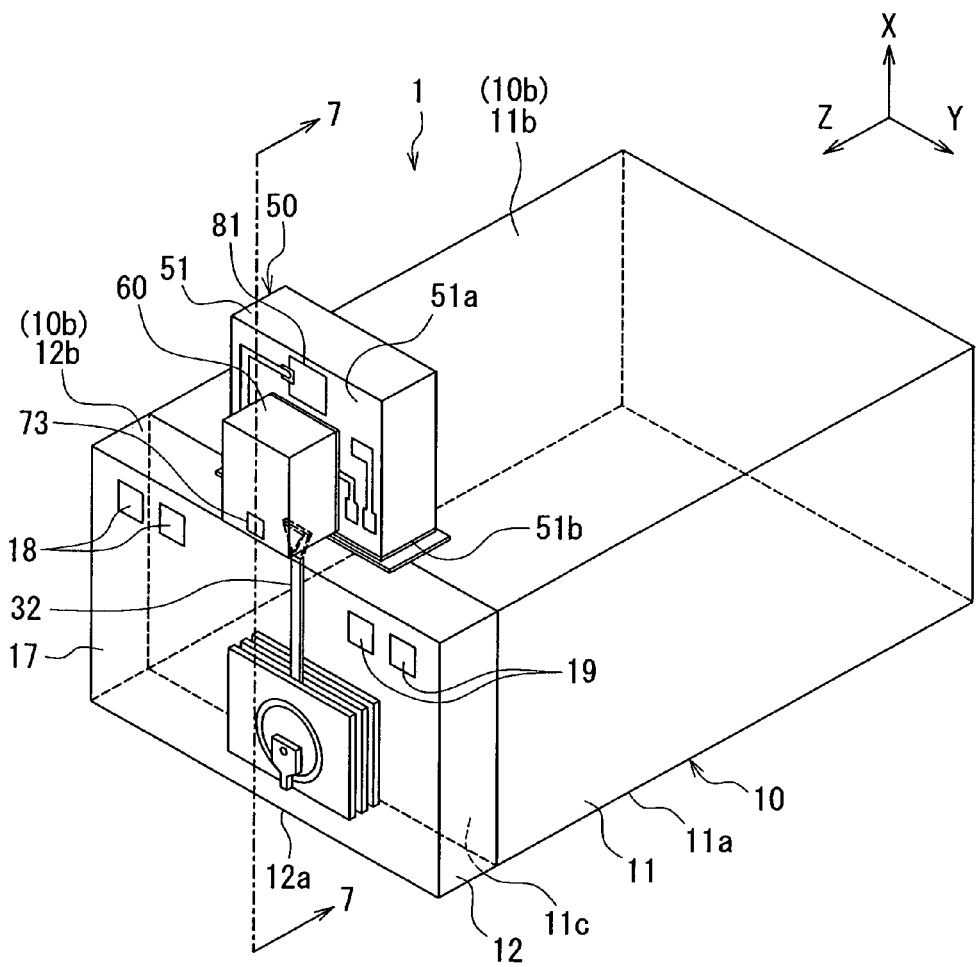
FIG. 6 is a perspective view showing a thermally-assisted magnetic recording head of the first embodiment of the invention.
Figure 7:
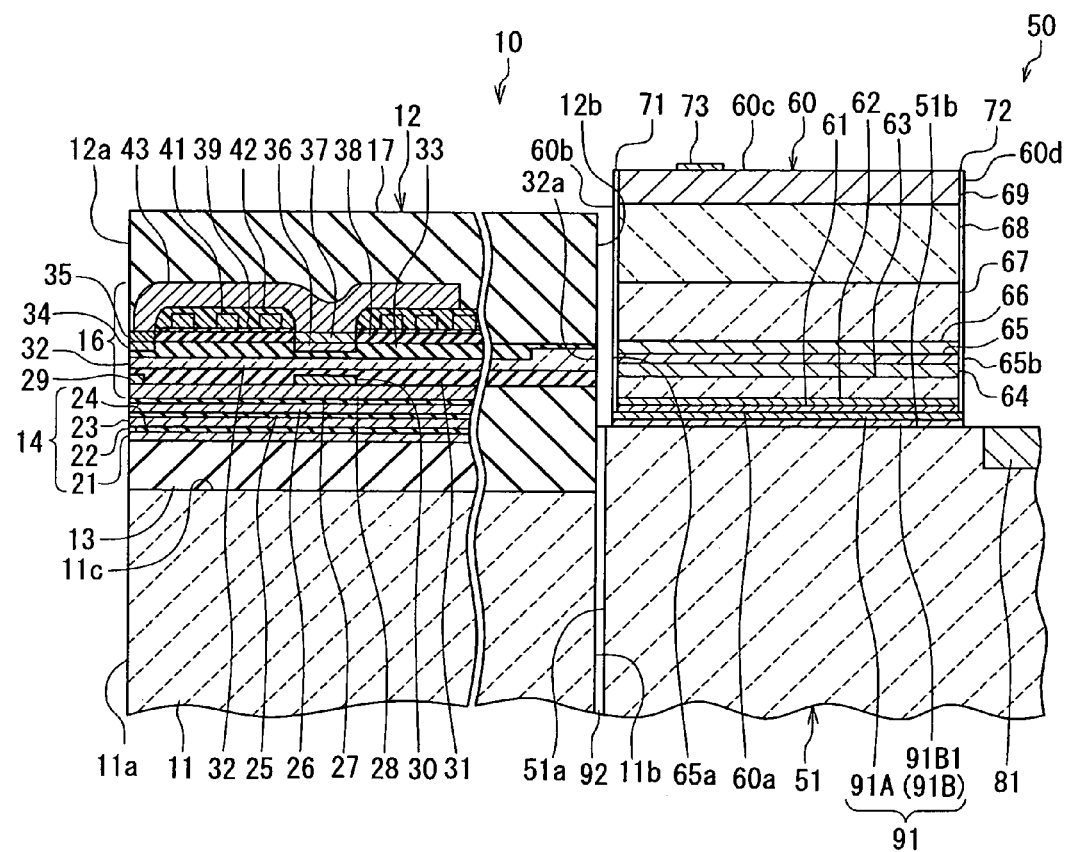
FIG. 7 shows a cross section taken along line 7-7 of FIG. 6.
Figure 8:
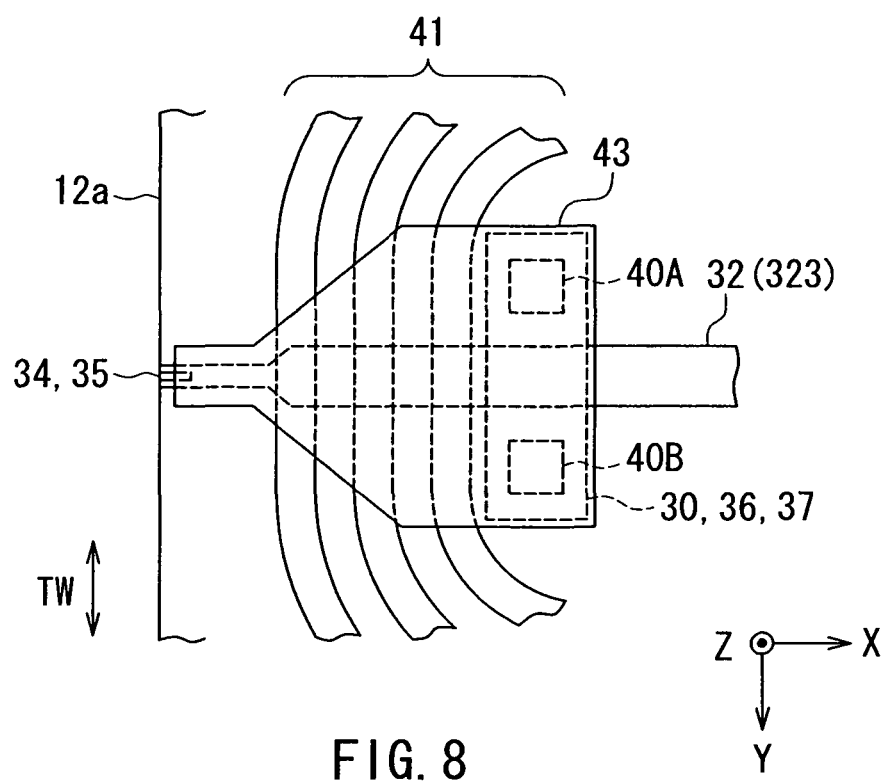
FIG. 8 is a plan view showing a part of a head unit of a slider of the first embodiment of the invention.

The configuration of the thermally-assisted magnetic recording head 1 of the present embodiment will now be described with reference to FIG. 6 to FIG. 8. FIG. 6 is a perspective view showing the thermally-assisted magnetic recording head 1. FIG. 7 shows a cross section taken along line 7-7 of FIG. 6. FIG. 8 is a plan view showing a part of a head unit of the slider 10. The thermally-assisted magnetic recording head 1 includes the slider 10 and the light source unit 50.

The slider 10 includes a slider substrate 11 made of a ceramic material such as aluminum oxide-titanium carbide ($Al_2O_3$—TiC), and a head unit 12. The slider substrate 11 is generally rectangular-solid-shaped. The slider substrate 11 has a medium facing surface 11a facing the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 from the magnetic disk 201. The head unit 12 has a medium facing surface 12a facing the magnetic disk 201, and a rear surface 12b opposite to the medium facing surface 12a. The medium facing surface 12a is parallel to the medium facing surface 11a of the slider substrate 11, while the rear surface 12b is parallel to the rear surface 11b of the slider substrate 11. The rear surface 10b of the slider 10 is composed of the rear surfaces 11b and 12b.

Where the components of the head unit 12 are concerned, with respect to a reference position, a position located in the direction that extends perpendicular to the element-forming surface 11c and away from the element-forming surface 11c is defined as "above", and a position located in the direction opposite to the aforementioned direction is defined as "below". Where the layers included in the head unit 12 are concerned, the surface closer to the element-forming surface 11c is defined as a "bottom surface," and the surface farther from the element-forming surface 11c is defined as a "top surface."

Further, X direction, Y direction, Z direction, −X direction, −Y direction, and −Z direction will be defined as follows. The X direction is the direction perpendicular to the medium facing surface 11a and from the medium facing surface 11a to the rear surface 11b. The Y direction is the direction parallel to the medium facing surface 11a and the element-forming surface 11c and from the back side to the front side of FIG. 7. The Z direction is the direction extending perpendicular to the element-forming surface 11c and away from the element-forming surface 11c. The −X direction, the −Y direction, and the −Z direction are opposite to the X direction, the Y direction, and the Z direction, respectively. As viewed from the slider 10, the magnetic disk 201 travels in the Z direction. The slider 10 has an air inflow end (a leading end) at the end of the medium facing surface 11a in the −Z direction. The slider 10 has an air outflow end (a trailing end) at the end of the medium facing surface 12a in the Z direction. The track width direction TW shown in FIG. 8 is parallel to the Y direction.

The light source unit 50 includes the unit substrate 51, the laser diode 60, the photodetector 81, and the first bonding layer 91. When in the state shown in FIG. 6 and FIG. 7, the first surface 51a of the unit substrate 51 is parallel to the element-forming surface 11c. The light source unit 50 and its components will be described, where appropriate, with respect to the X direction, the Y direction, the Z direction, the −X direction, the −Y direction, and the −Z direction defined above. In that case, the state shown in FIG. 6 and FIG. 7 shall be the reference state. Where the components of the light source unit 50 are concerned, a position located in the Z direction relative to a reference position will be defined as "above", and a position located in the opposite direction will be defined as "below".

The unit substrate 51 functions to support the laser diode 60 and also functions as a heat sink for dissipating heat generated by the laser diode 60. The unit substrate 51 is made of Si.

The first bonding layer 91 bonds the laser diode 60 and the unit substrate 51 together. The thermally-assisted magnetic recording head 1 further includes the second bonding layer 92 bonding the unit substrate 51 and the slider 10 together. Bonding the unit substrate 51 to the slider 10 allows the light source unit 50 to be secured to the slider 10. The unit substrate 51, the laser diode 60, the photodetector 81, the first bonding layer 91, and the second bonding layer 92 will be described in more detail later.

As shown in FIG. 7, the head unit 12 includes an insulating layer 13 disposed on the element-forming surface 11c, and further includes a read head section 14, a write head section 16 and a protective layer 17 which are stacked in this order on the insulating layer 13. The insulating layer 13 and the protective layer 17 are each made of an insulating material such as $Al_2O_3$ (hereinafter, also referred to as alumina).

The read head section 14 includes a bottom shield layer 21 disposed on the insulating layer 13, an MR element 22 disposed on the bottom shield layer 21, a top shield layer 23 disposed on the MR element 22, and an insulating layer 24 disposed between the bottom shield layer 21 and the top shield layer 23 and surrounding the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the planes of layers constituting the GMR element or the current-perpendicular-to-plane (CPP) type in which the sense current is fed in a direction generally perpendicular to the planes of layers constituting the GMR element. Where the MR element 22 is a TMR element or a CPP-type GMR element, the bottom shield layer 21 and the top shield layer 23 may also serve as electrodes for feeding the sense current to the MR element 22. Where the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes an insulating layer 25 disposed on the top shield layer 23, a middle shield layer 26 disposed on the insulating layer 25, and an insulating layer 27 disposed on the middle shield layer 26. The middle shield layer 26 functions to shield the MR element 22 from a magnetic field produced in the write head section 16. The insulating layers 25 and 27 are each made of an insulating material such as alumina. The middle shield layer 26 is made of a soft magnetic material. The insulating layer 25 and the middle shield layer 26 may be omitted.

The write head section 16 of the present embodiment is for use in perpendicular magnetic recording. The write head section 16 includes a bottom yoke layer 28 disposed on the insulating layer 27, a bottom shield layer 29 disposed on the bottom yoke layer 28 in the vicinity of the medium facing surface 12a, and a coupling layer 30 disposed on the bottom yoke layer 28 at a position away from the medium facing surface 12a. The bottom yoke layer 28, the bottom shield layer 29, and the coupling layer 30 are each made of a soft magnetic material.

The write head section 16 further includes a cladding layer 31 disposed to cover the bottom yoke layer 28, the bottom shield layer 29 and the coupling layer 30, the waveguide 32 disposed on the cladding layer 31, and a cladding layer 33 disposed to cover the cladding layer 31 and the waveguide 32. The waveguide 32 extends in a direction perpendicular to the medium facing surface 12a (the X direction). The waveguide 32 has the incidence end 32a, and a front end face opposite thereto. The waveguide 32 allows laser light to propagate therethrough, the laser light being the forward light 44 having been emitted from the first emission part 65a of the laser diode 60 and incident on the incidence end 32a.

The waveguide 32 is made of a dielectric material that transmits the laser light. Each of the cladding layers 31 and 33 is made of a dielectric material and has a refractive index lower than that of the wave guide 32. For example, where the laser light has a wavelength of 600 nm and the waveguide 32 is made of $Al_2O_3$ (refractive index n=1.63), the cladding layers 31 and 33 may be made of $SiO_2$ (n=1.46). Where the waveguide 32 is made of tantalum oxide such as $Ta_2O_5$ (n=2.16), the cladding layers 31 and 33 may be made of $SiO_2$ or $Al_2O_3$.

The write head section 16 further includes a plasmon generator 34 disposed above the waveguide 32 in the vicinity of the medium facing surface 12a, and a magnetic pole 35 disposed at such a location that the plasmon generator 34 is interposed between the magnetic pole 35 and the waveguide 32. The plasmon generator 34 is made of a conductive material such as metal. For example, the plasmon generator 34 may be made of one of Au, Ag, Al, Pd, Pt, Mg, Cu, In, Rh, Ir, and Ru, or an alloy composed of two or more of these materials. The magnetic pole 35 is made of a soft magnetic material, or a magnetic metal material in particular. The configurations and locations of the waveguide 32, the plasmon generator 34 and the magnetic pole 35 will be described in detail later.

The write head section 16 further includes a coupling layer 36 located away from the medium facing surface 12a and embedded in the cladding layer 33, and a coupling layer 37 lying on the coupling layer 36. The coupling layers 36 and 37 are located above the coupling layer 30. The coupling layers 36 and 37 are each made of a soft magnetic material.

As shown in FIG. 8, the write head section 16 further includes two coupling portions 40A and 40B embedded in the cladding layers 31 and 33. The coupling portions 40A and 40B are each made of a soft magnetic material. The coupling portions 40A and 40B are located on opposite sides of the waveguide 32 in the track width direction TW, each at a distance from the waveguide 32. The bottom surfaces of the coupling portions 40A and 40B are in contact with the top surface of the coupling layer 30. The top surfaces of the coupling portions 40A and 40B are in contact with the bottom surface of the coupling layer 36.

The write head section 16 further includes an insulating layer 38 disposed around the magnetic pole 35 and the coupling layer 37, an insulating layer 39 disposed on the insulating layer 38, a coil 41 disposed on the insulating layer 39, and an insulating layer 42 covering the coil 41. The insulating layers 38 and 39 are each made of an insulating material such as alumina. The coil 41 is planar spiral-shaped and wound around the coupling layer 37. The coil 41 produces a magnetic field corresponding to data to be written on the magnetic disk 201. The coil 41 is made of a conductive material such as copper. The insulating layer 42 is made of photoresist, for example.

The write head section 16 further includes a top yoke layer 43. The top yoke layer 43 lies on the magnetic pole 35, the insulating layer 42 and the coupling layer 37. A portion of the top yoke layer 43 located near the medium facing surface 12a is in contact with the top surface of the magnetic pole 35, and another portion of the top yoke layer 43 away from the medium facing surface 12a is in contact with the top surface of the coupling layer 37. The top yoke layer 43 is made of a soft magnetic material.

In the write head section 16, a magnetic path for passing a magnetic flux corresponding to the magnetic field produced by the coil 41 is formed by the bottom shield layer 29, the bottom yoke layer 28, the coupling layer 30, the coupling portions 40A and 40B, the coupling layers 36 and 37, the top yoke layer 43, and the magnetic pole 35. The magnetic pole 35 has an end face located in the medium facing surface 12a, allows the magnetic flux corresponding to the magnetic field produced by the coil 41 to pass, and produces a write magnetic field for writing data on the magnetic disk 201 by means of the perpendicular magnetic recording system. The bottom shield layer 29 captures a magnetic flux produced from the end face of the magnetic pole 35 and spreading in directions other than the direction perpendicular to the plane of the magnetic disk 201, and thereby prevents the magnetic flux from reaching the magnetic disk 201.

As shown in FIG. 7, the protective layer 17 is disposed to cover the write head section 16. As shown in FIG. 6, the head unit 12 further includes a pair of terminals 18 disposed on the top surface of the protective layer 17 and electrically connected to the MR element 22, and a pair of terminals 19 disposed on the top surface of the protective layer 17 and electrically connected to the coil 41. These terminals 18 and 19 are electrically connected to four of the plurality of pad-shaped terminals of the wiring member 224 shown in FIG. 5.

The waveguide 32 will now be described in more detail with reference to FIG. 1 and FIG. 2. The waveguide 32 has a first propagation part 321 extending in the −X direction from the rear surface 12b to a predetermined position not reaching the medium facing surface 12a, a second propagation part 322 stacked on the first propagation part 321, and a third propagation part 323 extending in the −X direction from the aforementioned predetermined position to be continuous with the first propagation part 321.

The first propagation part 321 has an incidence end face located in the rear surface 12b, an emitting end face opposite to the incidence end face, a top surface, a bottom surface, and two side surfaces. The incidence end face and the emitting end face of the first propagation part 321 are rectangular in shape, for example. The incidence end face of the first propagation part 321 forms a part of the incidence end 32a of the waveguide 32. The width of the first propagation part 321 in the Y direction decreases toward the emitting end face. Each of the top and bottom surfaces of the first propagation part 321 is in the shape of a trapezoid such that the side closer to the medium facing surface 12a is shorter than the side located in the rear surface 12b.

The second propagation part 322 is located on the top surface of the first propagation part 321. The second propagation part 322 has an incidence end face located in the rear surface 12b, an edge part opposite to the incidence end face, a top surface, a bottom surface in contact with the top surface of the first propagation part 321, and two side surfaces. The incidence end face of the second propagation part 322 is rectangular in shape, for example. The incidence end face of the second propagation part 322 forms the remaining part of the incidence end 32a of the waveguide 32. The incidence end 32a is composed of the incidence end face of the first propagation part 321 and the incidence end face of the second propagation part 322. The edge part is defined by the two side surfaces intersecting each other. The edge part is located closer to the rear surface 12b than is the emitting end face of the first propagation part 321. The width of the second propagation part 322 in the Y direction decreases toward the edge part. Each of the top and bottom surfaces of the second propagation part 322 is in the shape of a triangle with its vertex oriented toward the medium facing surface 12a.

For example, the first and second propagation parts 321 and 322 are both rectangular in cross section parallel to the rear surface 12b. The thickness (the dimension in the Z direction) of each of the first and second propagation parts 321 and 322 is constant or almost constant regardless of the distance from the rear surface 12b. The second propagation part 322 is smaller than the first propagation part 321 in length in the X direction.

The width of the first propagation part 321 in the rear surface 12b falls within the range of 1 to 10 μm, for example. The total thickness of the first and second propagation parts 321 and 322 falls within the range of 1 to 10 μm, for example.

The third propagation part 323 has an incidence end face 323a connected to the emitting end face of the first propagation part 321, and a front end face opposite to the incidence end face 323a. The incidence end face 323a and the front end face are rectangular in shape, for example.

Figure 9:
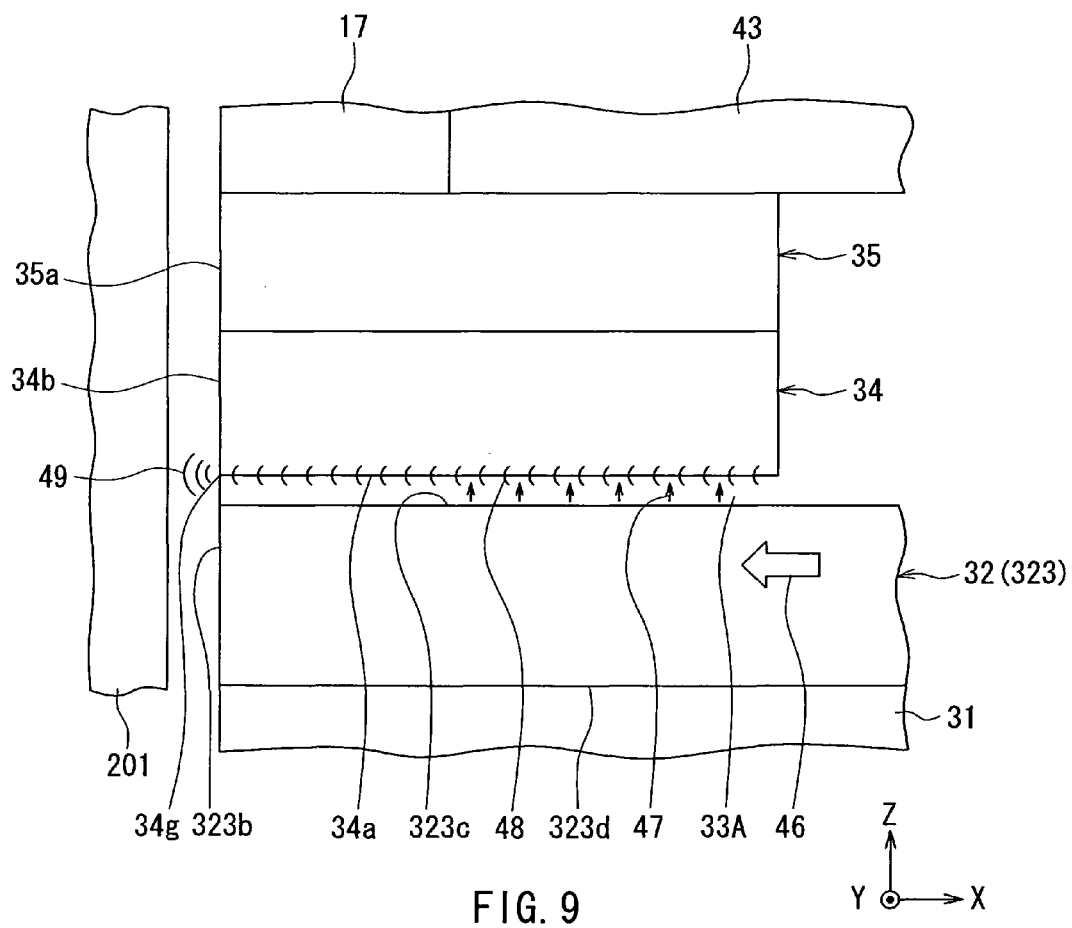
FIG. 9 is a cross-sectional view showing a part of a waveguide, a plasmon generator, and a magnetic pole of the first embodiment of the invention.

Reference is now made to FIG. 9 to describe an example of the shapes and locations of the third propagation part 323 of the waveguide 32, the plasmon generator 34 and the magnetic pole 35. FIG. 9 is a cross-sectional view showing the third propagation part 323, the plasmon generator 34 and the magnetic pole 35.

In the example shown in FIG. 9, the third propagation part 323 has the front end face 323b, an evanescent light generating surface 323c which is a top surface, a bottom surface 323d, and two side surfaces (not shown), as well as the incidence end face 323a shown in FIG. 2. The front end face 323b also serves as the front end face of the waveguide 32. The front end face 323b is rectangular in shape, for example. The evanescent light generating surface 323c generates evanescent light based on the light propagating through the third propagation part 323.

In the example shown in FIG. 9, the plasmon generator 34 has an outer surface that includes a plasmon exciting part 34a and a front end face 34b. The plasmon exciting part 34a is a bottom end of the plasmon generator 34 opposed to the evanescent light generating surface 323c of the third propagation part 323 with a predetermined spacing therebetween. The front end face 34b is located in the medium facing surface 12a. The plasmon exciting part 34a is configured so that surface plasmons are excited thereon through coupling with the evanescent light generated from the evanescent light generating surface 323c. The front end face 34b includes a near-field light generating part 34g. To be specific, the near-field light generating part 34g is an end of the front end face 34b intersecting the plasmon exciting part 34a, or refers to this end and a portion in the neighborhood thereof. The near-field light generating part 34g generates near-field light based on the surface plasmons excited on the plasmon exciting part 34a.

The plasmon generator 34 is in the shape of a triangular prism, for example. In this case, the front end face 34b is in the shape of a triangle with its vertex downward. Furthermore, in this case, the outer surface of the plasmon generator 34 further includes a top surface and two inclined surfaces connected to the front end face 34b, and an edge part opposite to the top surface. The top surface connects the respective top ends of the two inclined surfaces. The two inclined surfaces decrease in distance from each other with increasing distance from the top surface. The edge part is defined by the two inclined surfaces intersecting each other. The plasmon exciting part 34a is formed of the edge part.

As shown in FIG. 9, the part of the cladding layer 33 interposed between the evanescent light generating surface 323c and the plasmon exciting part 34a forms a buffer part 33A having a refractive index lower than that of the waveguide 32.

In the example shown in FIG. 9, the magnetic pole 35 is disposed at such a location that the plasmon generator 34 is interposed between the magnetic pole 35 and the third propagation part 323. In this example, in particular, the magnetic pole 35 is in contact with the plasmon generator 34. The magnetic pole 35 has an end face 35a located in the medium facing surface 12a. The end face 35a is rectangular in shape, for example.

The shapes and locations of the third propagation part 323, the plasmon generator 34 and the magnetic pole 35 are not limited to the foregoing example described with reference to FIG. 9.

The unit substrate 51, the laser diode 60, the photodetector 81, the first bonding layer 91, and the second bonding layer 92 will now be described in detail. First, the laser diode 60 will be described with reference to FIG. 1, FIG. 2 and FIG. 7. As mentioned previously, the outer surface of the laser diode 60 or the electronic component includes the bottom surface 60a, the front end face 60b, the top surface 60c, the rear end face 60d, and the two side surfaces 60e and 60f. The front end face 60b faces the incidence end 32a of the waveguide 32 when in the state in which the unit substrate 51 is bonded to the slider 10.

Reference is now made to FIG. 7 to describe an example of the specific configuration of the laser diode 60. For example, the laser diode 60 is an edge-emitting stripe laser diode. The laser diode 60 has a multi-layer structure in which a p-electrode 61, a p-electrode underlayer 62, a p-cladding layer 63, a first guide layer 64, an active layer 65, a second guide layer 66, an n-cladding layer 67, an n-substrate 68, and an n-electrode 69 are arranged in this order from the bottom surface 60a side. The two cleavage planes of the aforementioned multi-layer structure are coated with reflection layers 71 and 72 of $SiO_2$, $Al_2O_3$ or the like for totally reflecting light to induce oscillation. The bottom surface 60a and the top surface 60c are located at opposite ends in a direction perpendicular to the plane of the active layer 65. The bottom surface 60a is formed of the surface of the p-electrode 61. The top surface 60c is formed of the surface of the n-electrode 69. The front end face 60b is formed of the surface of the reflection layer 71. The rear end face 60d is formed of the surface of the reflection layer 72.

Although not illustrated, the laser diode 60 has a stripe-shaped light propagation path that includes part of the active layer 65 and extends in a direction perpendicular to the front end face 60b and the rear end face 60d. A laser diode having such a stripe-shaped light propagation path is called a stripe laser diode. The first emission part 65a is located at the end of the light propagation path closer to the front end face 60b. The second emission part 65b is located at the end of the light propagation path closer to the rear end face 60d. The emission parts 65a and 65b emit beams of laser light (the forward light 44 and the backward light 45) in directions opposite to each other and parallel to the plane of the active layer 65. Such a laser diode that emits laser light in a direction parallel to the plane of the active layer 65 is called an edge-emitting laser diode. The laser diode 60 preferably allows the first and second emission parts 65a and 65b to emit polarized light of TM-mode whose electric field oscillates in a direction perpendicular to the plane of the active layer 65. The laser diode 60 of the present embodiment can be formed into various configurations without being limited to the configuration shown in FIG. 7.

As shown in FIG. 1, the forward light 44 emitted from the first emission part 65a travels toward the incidence end 32a of the waveguide 32 and is incident on the waveguide 32. The backward light 45 emitted from the second emission part 65b travels in the direction opposite to the direction of the forward light 44. The intensity of the backward light 45 is lower than the intensity of the forward light 44 and proportional to the intensity of the forward light 44. For example, the ratio of the intensity of the backward light 45 to the intensity of the forward light 44 is within the range of 2% to 25%.

The laser diode 60 may be a laser diode of InP type, GaAs type, GaN type or the like that is commonly used for such applications as communications, optical disc storage and material analysis. The laser light (the forward light 44 and the backward light 45) to be emitted by the laser diode 60 may have any wavelength within the range of, for example, 375 nm to 1.7 μm. Specifically, the laser diode 60 may be an InGaAsP/InP quarternary mixed crystal laser diode having an emittable wavelength range of 1.2 to 1.67 μm, for example.

The laser diode 60 further has a light source terminal 73 made of a conductive material, disposed on the n-electrode 69 and electrically connected to the n-electrode 69. The light source terminal 73 is electrically connected to one of the plurality of pad-shaped terminals of the wiring member 224 shown in FIG. 5.

As shown in FIG. 2, the thickness (the dimension in the Z direction) of the laser diode 60 will be represented by $T_{LA}$, and the length of the laser diode 60 in the X direction will be represented by $H_{LA}$. Further, as shown in FIG. 3, the width of the laser diode 60 in the Y direction will be represented by $W_{LA}$. $T_{LA}$ falls within the range of 60 to 200 μm, for example. $H_{LA}$ is 300 μm, for example. $W_{LA}$ falls within the range of 150 to 250 μm, for example.

The unit substrate 51 and the first bonding layer 91 will now be described with reference to FIG. 1 to FIG. 3 and FIG. 7. As previously mentioned, the outer surface of the unit substrate 51 or the first member includes the first surface 51a, the second surface 51b, and the third surface. The third surface includes the surfaces 51c, 51d, 51e, and 51f. The first bonding layer 91 is interposed between the first surface 51a and the bottom surface 60a of the laser diode 60.

The first bonding layer 91 includes a first bonding material layer 91A made of a first bonding material. The first bonding material melts when heated to a first melting temperature or higher. The first melting temperature is in the range of 310° C. to 360° C., for example. The first bonding material may be AuSn solder, for example.

The first bonding layer 91 further includes an electrode layer 91B made of a conductive material and located on the first surface 51a of the unit substrate 51. The electrode layer 91B includes a first portion 91B1, and a second portion 91B2 contiguous with the first portion 91B1. The first portion 91B1 is located directly below the laser diode 60. The first bonding material layer 91A is interposed between the p-electrode 61 of the laser diode 60 and the first portion 91B1. The first portion 91B1 is electrically connected to the p-electrode 61 via the first bonding material layer 91A. As shown in FIG. 3, the second portion 91B2 extends from the first portion 91B1 to a side of the laser diode 60 (the right side in FIG. 3). The electrode layer 91B is also electrically connected to one of the plurality of pad-shaped terminals of the wiring member 224 shown in FIG. 5.

As shown in FIG. 2 and FIG. 7, the first bonding layer 91 bonds the laser diode 60 and the unit substrate 51 together, with the first bonding material layer 91A and the first portion 91B1 interposed between the bottom surface 60a of the laser diode 60 and the first surface 51a of the unit substrate 51, the first bonding material layer 91A and the first portion 91B1 being arranged in this order from the laser diode 60 side. The electrode layer 91B serves as part of the first bonding layer 91 to bond the laser diode 60 and the unit substrate 51 together, and also serves as a lead for electrically connecting the p-electrode 61 of the laser diode 60 to an external terminal. The laser diode 60 is supplied with a predetermined voltage via the electrode layer 91B and the light source terminal 73. The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

As shown in FIG. 2, the thickness (the dimension in the Z direction) of the unit substrate 51 will be represented by $T_{UN}$, and the length of the unit substrate 51 in the X direction will be represented by $H_{UN}$. Further, as shown in FIG. 3, the width of the unit substrate 51 in the Y direction will be represented by $W_{UN}$. $T_{UN}$ is 300 μm, for example. $H_{UN}$ is sufficiently greater than the length $H_{LA}$ of the laser diode 60 in the X direction. $H_{UN}$ is 450 μm, for example. $W_{UN}$ is 500 μm, for example.

The second bonding layer 92 will now be described with reference to FIG. 1 to FIG. 3. As mentioned previously, the second bonding layer 92 is interposed between the second surface 51b of the unit substrate 51 and the rear surface 10b of the slider 10. The second bonding layer 92 includes a second bonding material layer 92A made of a second bonding material. The second bonding material melts when heated to a second melting temperature or higher. In the present embodiment, the second melting temperature is lower than the first melting temperature. The second melting temperature is in the range of 190° C. to 230° C., for example. The second bonding material may be Sn solder, for example. The second bonding material layer 92A has a thickness in the range of 100 to 5000 nm, for example.

The second bonding layer 92 further includes a first metal layer 92B interposed between the second surface 51b and the second bonding material layer 92A, and a second metal layer 92C interposed between the rear surface 10b and the second bonding material layer 92A. The second metal layer 92C is larger than the first metal layer 92B in planar shape. In the example shown in FIG. 2, the second metal layer 92C is disposed across the rear surface 11b and the rear surface 12b. The first and second metal layers 92B and 92C are made of Au, for example. The first and second metal layers 92B and 92C each have a thickness in the range of 30 to 3000 nm, for example.

As shown in FIG. 2 and FIG. 3, the second bonding layer 92 bonds the unit substrate 51 and the slider 10 together, with the first metal layer 92B, the second bonding material layer 92A and the second metal layer 92C interposed between the second surface 51b of the unit substrate 51 and the rear surface 10b of the slider 10, the layers 92B, 92A and 92C being arranged in this order from the unit substrate 51 side. The light source unit 50 is thereby secured to the slider 10.

The photodetector 81 will now be described with reference to FIG. 1 to FIG. 3. As previously mentioned, the photodetector 81 has the light receiving surface 81a. The light receiving surface 81a is coplanar with the first surface 51a of the unit substrate 51. The light receiving surface 81a is rectangular in shape, for example. The backward light 45 emitted from the second emission part 65b of the laser diode 60 is diverging light, part of which is incident on the light receiving surface 81a. In FIG. 1, the direction of travel of the center of the backward light 45 is indicated by an arrow.

Now, a description will be given of an example of the specific configuration of the photodetector 81. For example, the photodetector 81 is a photodiode having a PIN-diode structure. The photodiode includes, as a plurality of semiconductor layers stacked one on another, a p-type semiconductor layer, an n-type (n+ type) semiconductor layer having a high impurity concentration, and an intrinsic layer disposed between the p-type semiconductor layer and the n-type semiconductor layer and formed of a semiconductor having a very low impurity concentration. The unit substrate 51 in which the photodiode is embedded can be constructed by, for example, forming the n-type semiconductor layer, the intrinsic layer, and the p-type semiconductor layer using well-known semiconductor manufacturing process techniques such as photolithography and ion injection on a semiconductor wafer made of Si. Alternatively, the unit substrate 51 can also be fabricated by embedding a chip-shaped photodiode in a recessed portion formed in the unit substrate 51.

Where the photodetector 81 is the photodiode mentioned above, the light source unit 50 further includes a first detector extraction electrode 55, a second detector extraction electrode 56, and a p-electrode 57 each of which is disposed on the first surface 51a of the unit substrate 51. The first detector extraction electrode 55 is disposed to extend from the left side to the upper side of the first portion 91B1 of the electrode layer 91B in FIG. 3. The second detector extraction electrode 56 is disposed on the right side of the second portion 91B2 of the electrode layer 91B in FIG. 3. The p-electrode 57 is electrically connected to the p-type semiconductor layer. The first detector extraction electrode 55 is electrically connected to the p-electrode 57. The second detector extraction electrode 56 is electrically connected to the n-type semiconductor layer. The photodiode is supplied with a predetermined voltage via the electrodes 55 and 56. Further, the electrodes 55 and 56 are electrically connected to two of the plurality of pad-shaped terminals of the wiring member 224 shown in FIG. 5. Note that the photodetector 81 of the present embodiment can be formed into various configurations without being limited to the above-described configuration.

Reference is now made to FIG. 1, FIG. 2 and FIG. 9 to describe the principle of generation of near-field light and the principle of thermally-assisted magnetic recording using near-field light. The forward light 44 emitted from the first emission part 65a of the laser diode 60 is incident on the incidence end 32a of the waveguide 32. The forward light 44, i.e., the laser light, incident on the incidence end 32a propagates through the first and second propagation parts 321 and 322. The laser light propagating through the second propagation part 322 gradually moves to the first propagation part 321 as it approaches the edge part of the second propagation part 322. The first and second propagation parts 321 and 322 function as a spot size converter for making the spot size of the emitted light smaller than that of the incident light. More specifically, the laser light propagating through the first and second propagation parts 321 and 322 decreases in beam diameter while propagating through the first and second propagation parts 321 and 322. The first and second propagation parts 321 and 322 may allow the laser light to propagate in a single mode.

The laser light having propagated through the first and second propagation parts 321 and 322 passes through the emitting end face of the first propagation part 321 and the incidence end face 323a of the third propagation part 323. The laser light 46 (see FIG. 9) having passed through the incidence end face 323a of the third propagation part 323 propagates through the third propagation part 323 and reaches the vicinity of the plasmon generator 34. The plasmon generator 34 is configured to excite surface plasmons on the plasmon generator 34 based on the light propagating through the third propagation part 323 and to generate near-field light from the medium facing surface 12a based on the surface plasmons. More specifically, in the third propagation part 323, the laser light 46 is totally reflected at the evanescent light generating surface 323c to cause the evanescent light generating surface 323c to generate evanescent light 47 permeating into the buffer part 33A. Then, surface plasmons 48 are excited on the plasmon exciting part 34a of the plasmon generator 34 through coupling with the evanescent light 47. The surface plasmons 48 propagate along the plasmon exciting part 34a to the near-field light generating part 34g located in the medium facing surface 12a. As a result, the surface plasmons 48 concentrate at the near-field light generating part 34g, and the near-field light generating part 34g generates near-field light 49 based on the surface plasmons 48.

The near-field light 49 is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 35 for data writing.

A method of manufacturing the slider 10 of the present embodiment will now be described briefly. The method of manufacturing the slider 10 includes the steps of forming components of a plurality of sliders 10 other than the slider substrates 11 on a substrate that includes portions to become the slider substrates 11 of the plurality of sliders 10, thereby fabricating a substructure including a plurality of rows of pre-slider portions that are to become the sliders 10 later; and forming the sliders 10 by cutting the substructure to separate the pre-slider portions from each other. In the step of forming the sliders 10, the cut surfaces are polished into the medium facing surfaces 11a and 12a.

Now, a description will be given of a method of manufacturing the light source unit 50 of the present embodiment and a method of securing the light source unit 50 to the slider 10. The following descriptions include a description of a method of manufacturing the electronic device according to the present embodiment. The method of manufacturing the light source unit 50 includes a step of fabricating the unit substrate 51 with the photodetector 81 embedded therein, and a first bonding step of bonding the laser diode 60 and the unit substrate 51 together via the first bonding layer 91. The method of securing the light source unit 50 includes a positioning step of positioning the light source unit 50 with respect to the slider 10 and a second bonding step of bonding the unit substrate 51 and the slider 10 together via the second bonding layer 92.

In the first bonding step, the laser diode 60 is bonded to the unit substrate 51 in the following manner, for example. First, the first bonding material layer 91A of the first bonding layer 91 is formed on the bottom surface 60a of the laser diode 60. Further, the electrode layer 91B of the first bonding layer 91 is formed on the first surface 51a of the unit substrate 51. The first detector extraction electrode 55, the second detector extraction electrode 56 and the p-electrode 57 may be formed at the same time the electrode layer 91B is formed. Next, the first bonding material layer 91A and the electrode layer 91B are brought into contact with each other to cause the first bonding material layer 91A and the electrode layer 91B to be interposed between the laser diode 60 and the unit substrate 51. Then, the unit substrate 51 in this state is heated so that the first bonding material layer 91A reaches the aforementioned first melting temperature. The first bonding material forming the first bonding material layer 91A is thereby melted. The melted first bonding material is then solidified to bond the laser diode 60 to the unit substrate 51.

In the method of securing the light source unit 50, the first metal layer 92B and a first layer 92A1 which constitutes part of the second bonding material layer 92A are formed in this order on the second surface 51b of the unit substrate 51 after the first bonding step and before the positioning step. Further, the second metal layer 92C and a second layer 92A2 which constitutes the remaining part of the second bonding material layer 92A are formed in this order on the rear surface 10b of the slider 10. Both the first layer 92A1 and the second layer 92A2 are made of the second bonding material. The first metal layer 92B, the first layer 92A1, the second layer 92A2, and the second metal layer 92C constitute a preliminary bonding layer 92P configured to later become the second bonding layer 92. The preliminary bonding layer 92P includes the second bonding material, that is, the first layer 92A1 and the second layer 92A2. The first layer 92A1 may have the same planar shape as that of the first metal layer 92B. The second layer 92A2 may have the same planar shape as that of the second metal layer 92C.

Figure 10:
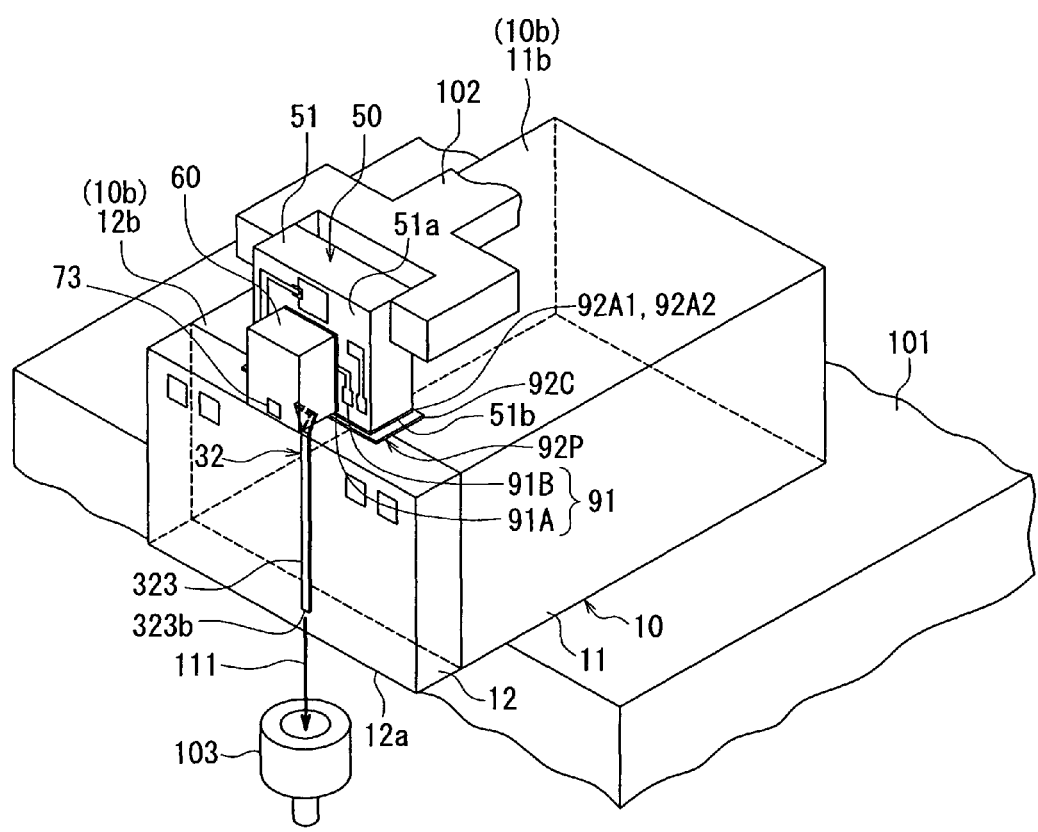
FIG. 10 is a perspective view illustrating a positioning step of a method of manufacturing the electronic device according to the first embodiment of the invention.

Next, the positioning step is performed. The positioning step will now be described in detail with reference to FIG. 1 and FIG. 10. FIG. 10 is a perspective view illustrating the positioning step. Note that FIG. 10 omits the first metal layer 92B. In this step, first, the slider 10 is secured to a stage 101. Then, the light source unit 50 is moved using a jig 102 so that the second surface 51b of the unit substrate 51 and the rear surface 10b of the slider 10 are opposed to each other with a predetermined spacing therebetween.

Next, a predetermined voltage is applied to the laser diode 60 through the electrode layer 91B and the light source terminal 73 to allow the laser diode 60 to emit laser light (the forward light 44) from the first emission part 65a (see FIG. 1). Then, the light source unit 50 is moved using the jig 102 in a direction parallel to the rear surface 10b to allow the laser light emitted from the laser diode 60 to be incident on the incidence end 32a (see FIG. 1) of the waveguide 32, and to adjust the position of the light source unit 50 relative to the slider 10 so that the quantity of the laser light incident on the wave guide 32 becomes maximum.

The laser light incident on the waveguide 32 propagates through the wave guide 32 and is emitted from the front end face of the waveguide 32 (the front end face 323b of the third propagation part 323) located in the medium facing surface 12a of the head unit 12. The light 111 emitted from the front end face of the waveguide 32 is detected by a photodetector 103 disposed to face the front end face of the waveguide 32. The quantity of the light 111 depends on the quantity of the laser light incident on the waveguide 32. The quantity of the laser light incident on the waveguide 32 can thus be known from the quantity of the light 111.

Next, the light source unit 50 is moved using the jig 102 in a direction perpendicular to the rear surface 10b to bring the first layer 92A1 and the second layer 92A2 into contact with each other. The position of the light source unit 50 relative to the slider 10 is thereby determined. Also, the preliminary bonding layer 92P is thereby interposed between the unit substrate 51 and the slider 10 before being bonded together.

Figure 11:
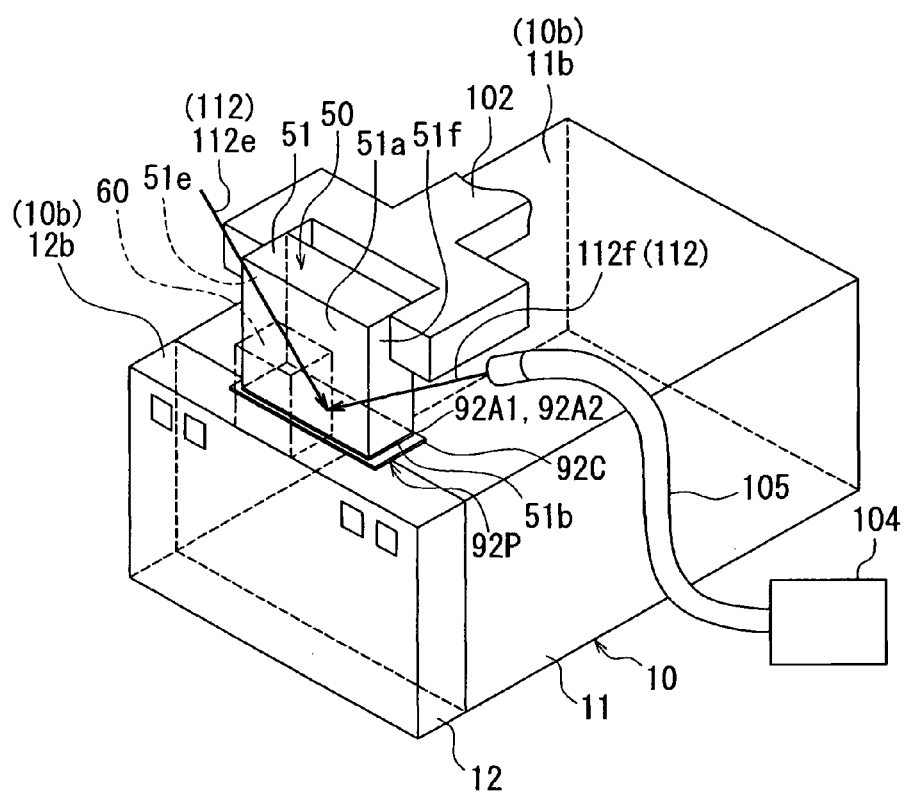
FIG. 11 is a perspective view illustrating a second bonding step of the method of manufacturing the electronic device according to the first embodiment of the invention.
Figure 12:
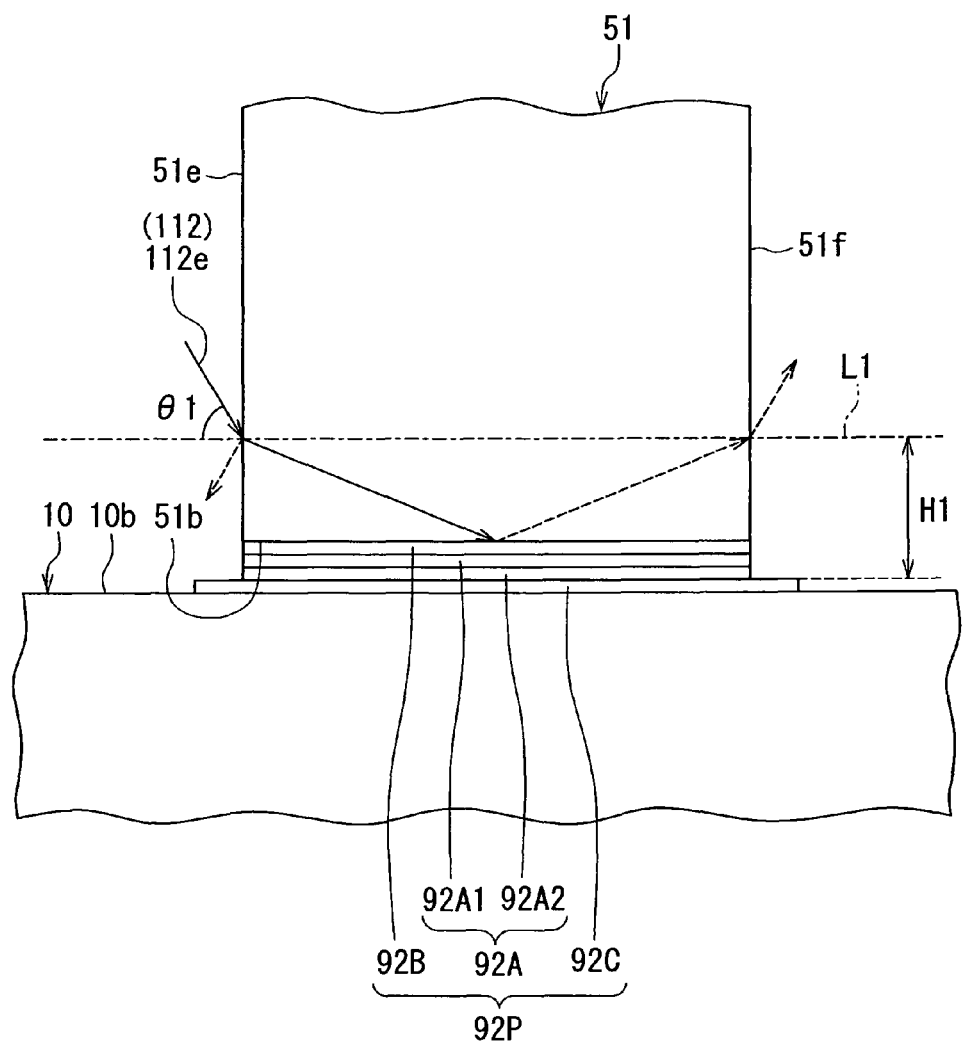
FIG. 12 is a cross-sectional view illustrating the step of FIG. 11.

The second bonding step is performed after the positioning step. The second bonding step will now be described in detail with reference to FIG. 11 and FIG. 12. FIG. 11 is a perspective view illustrating the second bonding step. Note that FIG. 11 omits the stage 101 and the first metal layer 92B. FIG. 12 is a cross-sectional view illustrating the second bonding step. In this step, with the preliminary bonding layer 92P interposed between the unit substrate 51 and the slider 10 before being bonded together, light 112 is projected to travel through the unit substrate 51 from the third surface to the second surface 51b of the unit substrate 51. In the present embodiment, the light 112 is laser light having a wavelength in the range of 1100 to 15000 nm. In FIG. 11, reference numeral 104 represents a laser light source for producing the light 112, and reference numeral 105 represents an optical fiber through which the light 112 propagates from the laser light source 104 to the vicinity of the third surface of the unit substrate 51.

The light 112 is incident particularly on the surfaces 51e and 51f of the third surface. Hereinafter, the light 112 incident on the surface 51e will also be referred to as the light 112e, while the light 112 incident on the surface 51f will also be referred to as the light 112f. FIG. 12 shows the light 112e. The light 112e enters the unit substrate 51 through a predetermined position on the surface 51e. Part of the light 112e is reflected off the surface 51e. The light 112e having entered the unit substrate 51 propagates through the unit substrate 51 and is projected onto the surface of the first metal layer 92B in contact with the second surface 51b. Part of the light 112e projected onto the surface of the first metal layer 92B is reflected off the surface of the first metal layer 92B, travels to the surface 51f and is then emitted through the surface 51f to outside the unit substrate 51. In FIG. 12, the dashed arrows indicate the light reflected off the surface 51e and the light reflected off the surface of the first metal layer 92B. The direction of travel of the light 112e is generally parallel to the first surface 51a.

The light 112f enters the unit substrate 51 through a predetermined position on the surface 51f. Although not illustrated, part of the light 112f is reflected off the surface 51f. The light 112f having entered the unit substrate 51 propagates through the unit substrate 51 and is projected onto the surface of the first metal layer 92B in contact with the second surface 51b. Part of the light 112f projected onto the surface of the first metal layer 92B is reflected off the surface of the first metal layer 92B, travels to the surface 51e and is then emitted through the surface 51e to outside the unit substrate 51. The direction of travel of the light 112f is generally parallel to the first surface 51a.

Here, assume an imaginary straight line L1 passing through the position of incidence of the light 112e on the surface 51e and extending in a direction perpendicular to the surface 51e. As shown in FIG. 12, symbol H1 represents the distance from the surface of the second metal layer 92C to the imaginary straight line L1, while symbol θ1 represents the angle that the direction of travel of the light 112e immediately before being incident on the surface 51e forms with the imaginary straight line L1, that is, the incident angle of the light 112e to the surface 51e. The distance H1 is 70 for example. The angle θ1 is 70°, for example. Note that the position of incidence of the light 112f on the surface 51f may or may not coincide with the point of intersection of the surface 51f and the imaginary straight line L1. Further, the direction of travel of the light 112f immediately before being incident on the surface 51f may form an angle the same as or different from the angle θ1 with the imaginary straight line L1.

The light 112e and the light 112f projected onto the surface of the first metal layer 92B heat the second bonding material included in the preliminary bonding layer 92P, that is, the first layer 92A1 and the second layer 92A2. The second bonding material melts by being heated to the second melting temperature or higher by the light 112e and 112f. Subsequently, the projection of the light 112e and 112f is stopped to solidify the second bonding material. This causes the first layer 92A1 and the second layer 92A2 to be integrated into the second bonding material layer 92A, thereby making the preliminary bonding layer 92P into the second bonding layer 92. The unit substrate 51 and the slider 10 are thereby bonded together to allow the light source unit 50 to be secured to the slider 10.

Now, a description will be given of the effects provided by the method of manufacturing the electronic device according to the present embodiment. The manufacturing method includes the first and second bonding steps described above. The second bonding step is performed after the first bonding step. In the second bonding step, the second bonding material included in the preliminary bonding layer 92P is heated and melted by irradiation with the light 112 projected to travel through the first member (the unit substrate) 51 from the third surface (51e, 51f) to the second surface 51b of the first member 51.

Part of the energy of the light 112 propagating through the first member 51 is absorbed by the first member 51 and transformed into heat. The heat is conducted also to the first bonding material layer 91A of the first bonding layer 91 which is not desired to melt. If the heat is conducted in a large quantity to the first bonding material layer 91A, the first bonding material forming the first bonding material layer 91A may melt to cause a change in the position of the electronic component 60 relative to the first member 51.

Figure 13:
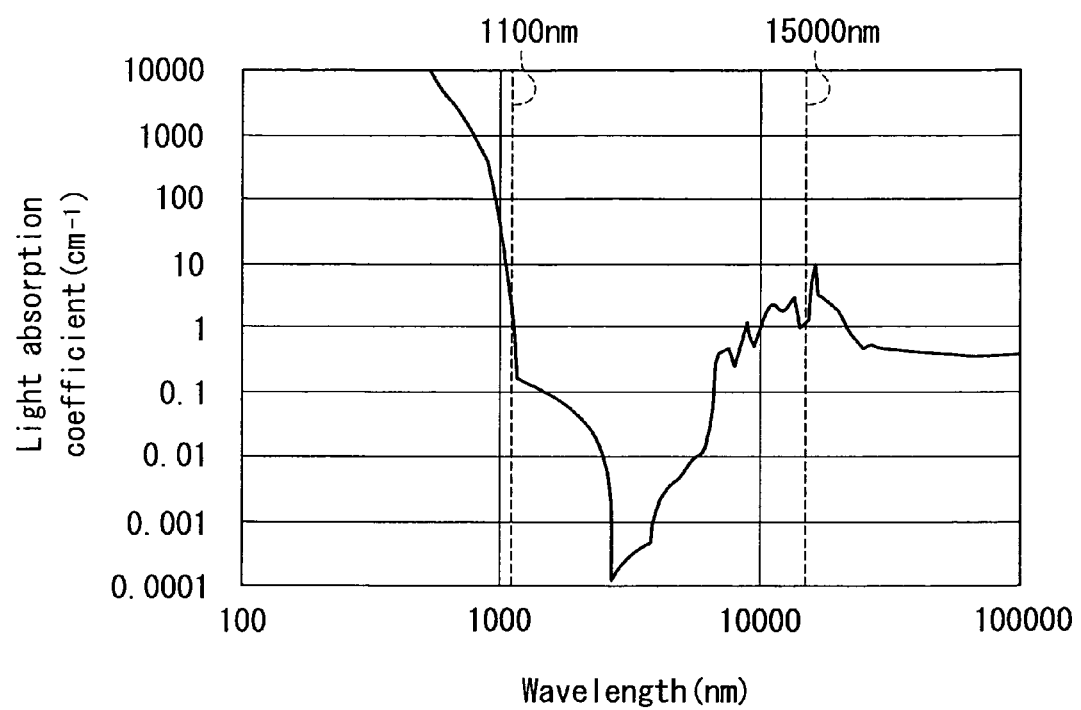
FIG. 13 is a characteristic diagram showing the light absorption coefficient of Si.

A lower light absorption coefficient of the material forming the first member 51 would cause a reduced amount of heat to be conducted to the first bonding material layer 91A. In the present embodiment, the first member 51 is made of Si. Now, the light absorption coefficient of Si will be described with reference to FIG. 13. FIG. 13 is a characteristic diagram showing the light absorption coefficient of Si. In FIG. 13, the horizontal axis represents the wavelength of light, and the vertical axis represents the light absorption coefficient. Note that FIG. 13 was plotted according to Edward D. Palik, "Handbook of Optical Constants of Solids", Academic Press, 1985. As can be seen from FIG. 13, the light absorption coefficient of Si is very low at wavelengths within the range of 1100 to 15000 nm. More specifically, the light absorption coefficient of Si is 3.57 $cm^{-1}$ or less when the wavelength of light falls within this range.

In the present embodiment, the first member 51 is made of Si, and the light 112 has a wavelength in the range of 1100 to 15000 nm. Thus, the first member 51 has a very low light absorption coefficient for the light 112. The present embodiment thus makes it possible that, of the total amount of energy of the light 112, the amount of energy to be absorbed by the first member 51 and transformed into heat is reduced to allow efficient utilization of the energy of the light 112 in heating the second bonding material. As a result, it is possible to prevent the first bonding material from melting in the second bonding step and thereby causing a change in the position of the electronic component 60 relative to the first member 51. Experimental results indicating this effect will be described later.

Materials having a low light absorption coefficient include $SiO_2$. However, $SiO_2$ is considerably lower in thermal conductivity than Si. As an example, the thermal conductivity at 300 K for Si is approximately 148 W/m·K, and that for $SiO_2$ is approximately 1.38 W/m·K. Accordingly, using $SiO_2$ as the material of the unit substrate 51 would inhibit the dissipation of heat generated by the laser diode 60 and thus make the unit substrate 51 unable to function as a heat sink. The present embodiment thus avoids the use of $SiO_2$ as the material of the unit substrate 51.

On the other hand, the use of Si, a semiconductor, as the material of the unit substrate 51 allows easy formation of the photodetector 81 embedded in the unit substrate 51 by using semiconductor manufacturing process techniques.

Further, in the present embodiment, the second melting temperature at which the second bonding material starts to melt is lower than the first melting temperature at which the first bonding material starts to melt. The present embodiment thus allows the second bonding material to be melted and solidified before the first bonding material is melted. Consequently, according to the present embodiment, it is possible to more effectively prevent a change in the position of the electronic component 60 relative to the first member 51.

Second Embodiment

Figure 14:
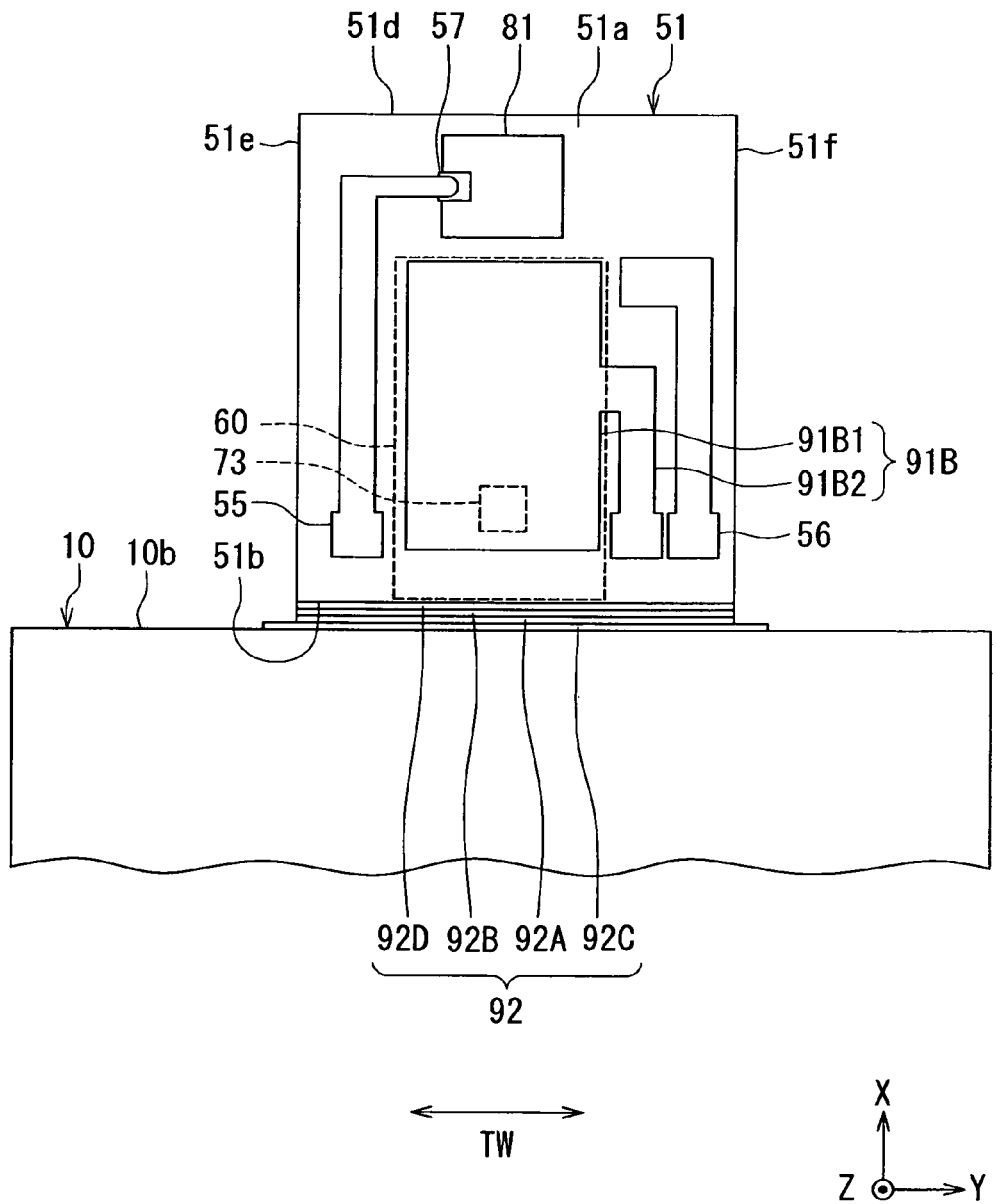
FIG. 14 is a plan view showing a first surface of a first member of an electronic device according to a second embodiment of the invention.

A second embodiment of the present invention will now be described with reference to FIG. 14. FIG. 14 is a plan view showing the first surface of the first member of the electronic device. In the present embodiment, the second bonding layer 92 includes a light absorption layer 92D interposed between the second surface 51b of the unit substrate (the first member) 51 and the second bonding material layer 92A. In the present embodiment, the first metal layer 92B is interposed between the second bonding material layer 92A and the light absorption layer 92D. The light absorption layer 92D may have the same planar shape as that of the first metal layer 92B. The light absorption layer 92D has a thickness in the range of 500 to 10000 nm, for example.

The light absorption layer 92D is intended to absorb the light 112 used in the second bonding step. The light absorption layer 92D has a higher light absorption coefficient for the light 112 than that of the unit substrate 51. The light absorption coefficient of the light absorption layer 92D for the light 112 is preferably $1 \times 10^3$ $cm^{-1}$ or higher. A preferable combination of materials of the unit substrate 51 and the light absorption layer 92D is such one that the unit substrate 51 and the light absorption layer 92D greatly differ in light absorption coefficient. One example thereof is a combination of Si for the unit substrate 51 and copper indium selenide (CIS), which is a material containing Cu, In and Se, for the light absorption layer 92D.

Figure 15:
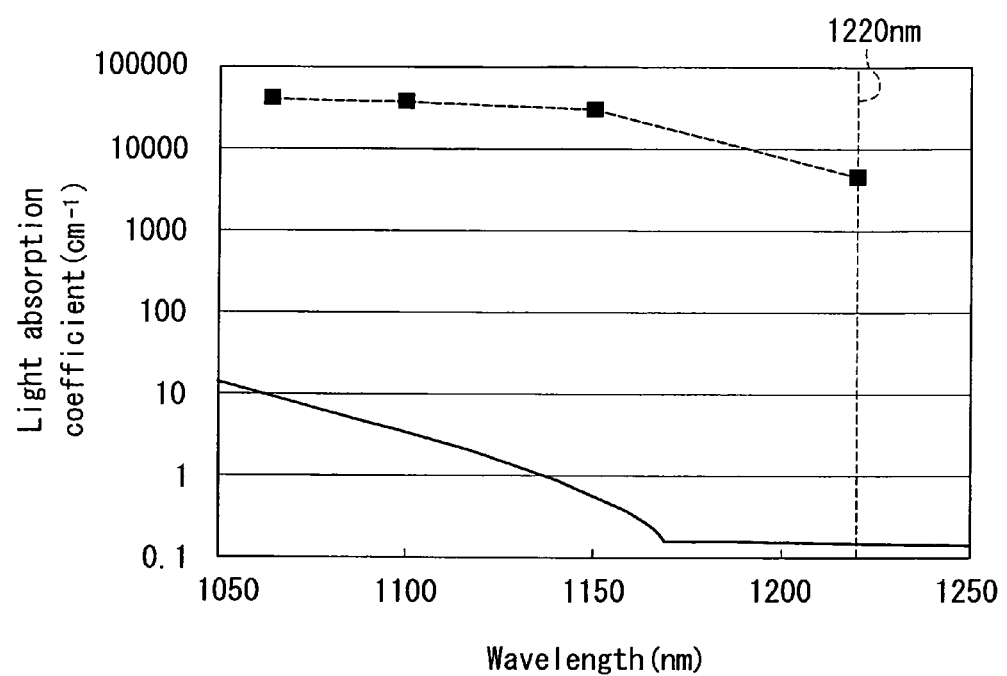
FIG. 15 is a characteristic diagram showing the light absorption coefficients of Si and CIS.

Now, the light absorption coefficients of Si and CIS will be described with reference to FIG. 15. FIG. 15 is a characteristic diagram showing the light absorption coefficients of Si and CIS. In FIG. 15, the horizontal axis represents the wavelength of light, while the vertical axis represents the light absorption coefficient. Further, in FIG. 15, the solid curve represents the light absorption coefficient of Si and the dashed curve represents the light absorption coefficient of CIS. Note that the light absorption coefficient of Si shown in FIG. 15 is the same as that shown in FIG. 13. As can be seen from FIG. 15, CIS is higher in light absorption coefficient than Si for light having a wavelength of 1100 to 1220 nm. The light absorption coefficient for the light having a wavelength of 1100 to 1220 nm is in the range of 0.15 to 3.57 $cm^{-1}$ for Si, and in the range of $4.6 \times 10^3$ to $3.8 \times 10^4$ $cm^{-1}$ for CIS.

In the present embodiment, the wavelength of the light 112 used in the second bonding step to be described later is not limited to within the range of 1100 to 1220 nm. The remainder of configuration of the electronic device (the thermally-assisted magnetic recording head) according to the present embodiment is the same as that of the first embodiment.

The features of the method of manufacturing the electronic device according to the present embodiment will now be described. In the present embodiment, the light absorption layer 92D, the first metal layer 92B, and the first layer 92A1 are formed in this order on the second surface 51b of the unit substrate 51 after the first bonding step and before the positioning step. Further, the second metal layer 92C and the second layer 92A2 are formed in this order on the rear surface 10b of the slider 10. The light absorption layer 92D, the first metal layer 92B, the first layer 92A1, the second layer 92A2, and the second metal layer 92C constitute a preliminary bonding layer 92P configured to later become the second bonding layer 92. The preliminary bonding layer 92P includes the light absorption layer 92D and the second bonding material, that is, the first layer 92A1 and the second layer 92A2.

In the second bonding step, as with the first embodiment, the second bonding material included in the preliminary bonding layer 92P is heated using the light 112, which is laser light having a wavelength in the range of 1100 to 15000 nm, for example. The light absorption layer 92D has a light absorption coefficient higher than that of the unit substrate 51 for the light 112 having a wavelength in the aforementioned range. Thus, part of the light 112 is absorbed by the light absorption layer 92D.

Figure 16:
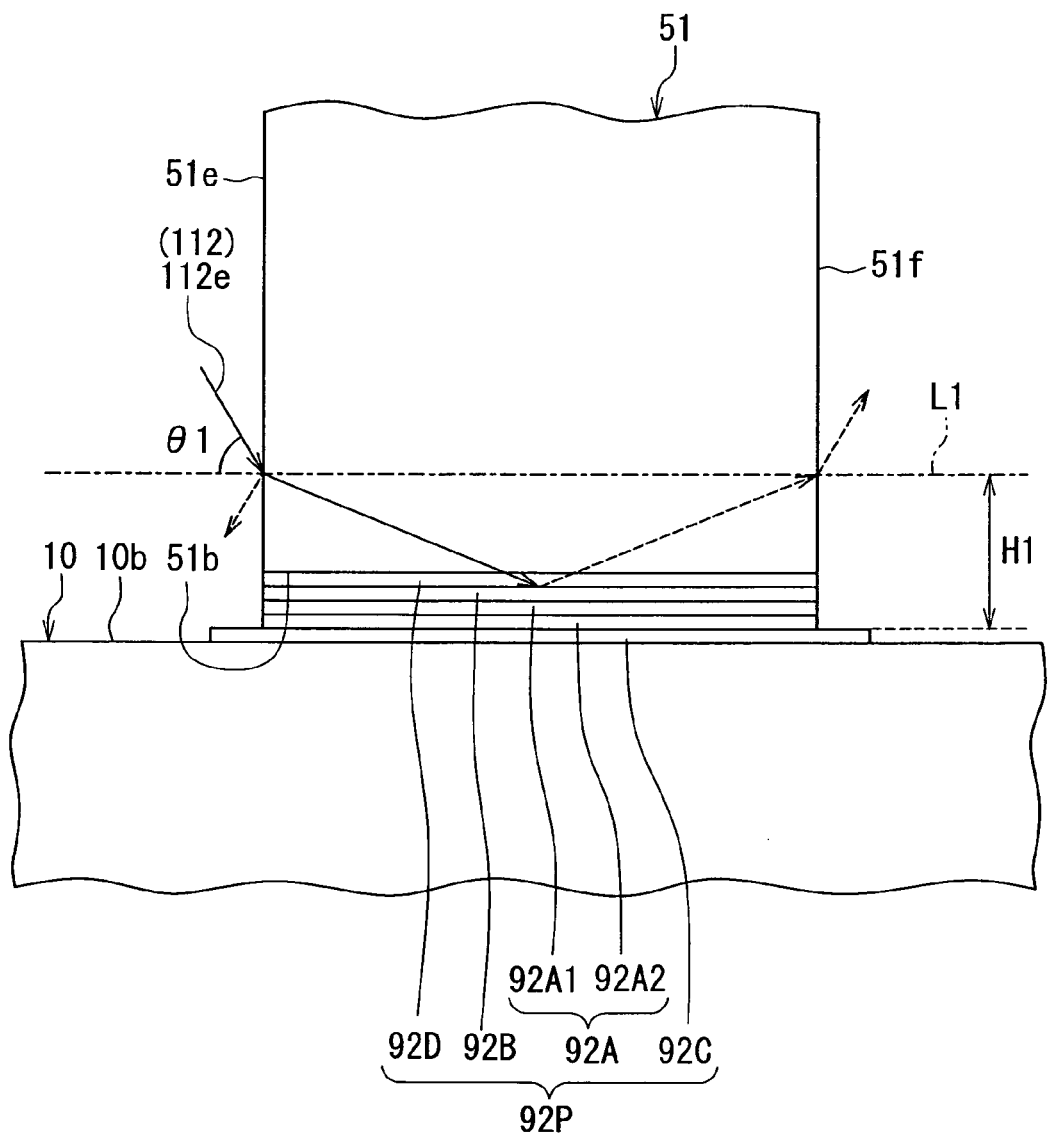
FIG. 16 is a cross-sectional view illustrating a second bonding step of a method of manufacturing the electronic device according to the second embodiment of the invention.

Now, the second bonding step of the present embodiment will be described in more detail with reference to FIG. 16. FIG. 16 is a cross-sectional view illustrating the second bonding step. The light 112e incident on the surface 51e enters the unit substrate 51 through a predetermined position on the surface 51e. The light 112e having entered the unit substrate 51 propagates through the unit substrate 51, passes through the second surface 51b and the light absorption layer 92D in this order, and is projected onto the surface of the first metal layer 92B in contact with the light absorption layer 92D. Part of the light 112e projected onto the surface of the first metal layer 92B is reflected off the surface of the first metal layer 92B, passes through the light absorption layer 92D and the second surface 51b in this order toward the surface 51f, and is then emitted through the surface 51f to outside the unit substrate 51. In FIG. 16, the dashed arrows indicate the light reflected off the surface 51e and the light reflected off the surface of the first metal layer 92B.

The light 112f (see FIG. 11) incident on the surface 51f enters the unit substrate 51 through a predetermined position on the surface 51f. Although not illustrated, the light 112f having entered the unit substrate 51 propagates through the unit substrate 51, passes through the second surface 51b and the light absorption layer 92D in this order, and is projected onto the surface of the first metal layer 92B in contact with the light absorption layer 92D. Part of the light 112f projected onto the surface of the first metal layer 92B is reflected off the surface of the first metal layer 92B, passes through the light absorption layer 92D and the second surface 51b in this order toward the surface 51e, and is then emitted through the surface 51e to outside the unit substrate 51.

The light 112e and the light 112f projected onto the surface of the first metal layer 92B heat the second bonding material included in the preliminary bonding layer 92P, that is, the first layer 92A1 and the second layer 92A2. In the present embodiment, in particular, part of the light 112e and 112f passing through the light absorption layer 92D is absorbed by the light absorption layer 92D and transformed into heat. The heat heats the second bonding layer 92. In this manner, the second bonding layer 92 is heated to the second melting temperature or higher.

In the method of manufacturing the electronic device according to the present embodiment, the second bonding layer 92 is heated by the heat resulting from transformation in the light absorption layer 92D as well as by the light 112 projected onto the surface of the first metal layer 92B. The present embodiment thus allows the energy of the light 112 to be efficiently utilized in heating the second bonding material. Consequently, it is possible to prevent the first bonding material from melting in the second bonding step and thereby causing a change in the position of the laser diode (the electronic component) 60 relative to the unit substrate (the first member) 51. Experimental results indicating this effect will be described later.

Further, according to the electronic device of the present embodiment, at least when the second bonding material is heated using the light 112 having a wavelength in the range of 1100 to 1220 nm in order to bond the unit substrate 51 and the slider 10 together in the process of manufacturing the electronic device, it is possible to utilize the energy of the light 112 efficiently in heating the second bonding material. It is thus possible to prevent a change in the position of the laser diode (the electronic component) 60 relative to the unit substrate (the first member) 51 in the process of manufacturing the electronic device.

The remainder of configuration, function and effects of the present embodiment are similar to those of the first embodiment.

Experimental Results

Now, a description will be given of the results of an experiment which was performed to evaluate the second bonding step of the present invention using a first practical example, a second practical example and a comparative example to be described below. To begin with, electronic devices of the first practical example, the second practical example and the comparative example will be described. These electronic devices each include the laser diode 60, the unit substrate 51, the slider 10, and the first bonding layer 91 described in the first embodiment section. The unit substrate 51 is made of Si. The unit substrate 51 is 500 μm in width $W_{UN}$ in the Y direction (see FIG. 3). The first bonding layer 91 includes the first bonding material layer 91A that is made of AuSn solder.

The electronic device of the first practical example and the electronic device of the comparative example each further include the second bonding layer 92 described in the first embodiment section. The second bonding layer 92 includes the second bonding material layer 92A made of Sn solder, and the first and second metal layers 92B and 92C made of Au. The total thickness of the first layer 92A1 and the second layer 92A2 before bonding is 400 nm, and each of the first and second metal layers 92B and 92C has a thickness of 100 nm.

The electronic device of the second practical example further includes the second bonding layer 92 described in the second embodiment section. The second bonding layer 92 includes the second bonding material layer 92A made of Sn solder, the first and second metal layers 92B and 92C made of Au, and the light absorption layer 92D made of CIS. The light absorption layer 92D has a thickness of 2000 nm. The total thickness of the first layer 92A1 and the second layer 92A2 before bonding and the thickness of each of the first and second metal layers 92B and 92C are the same as those in the electronic device of the first practical example or the comparative example.

Figure 17:
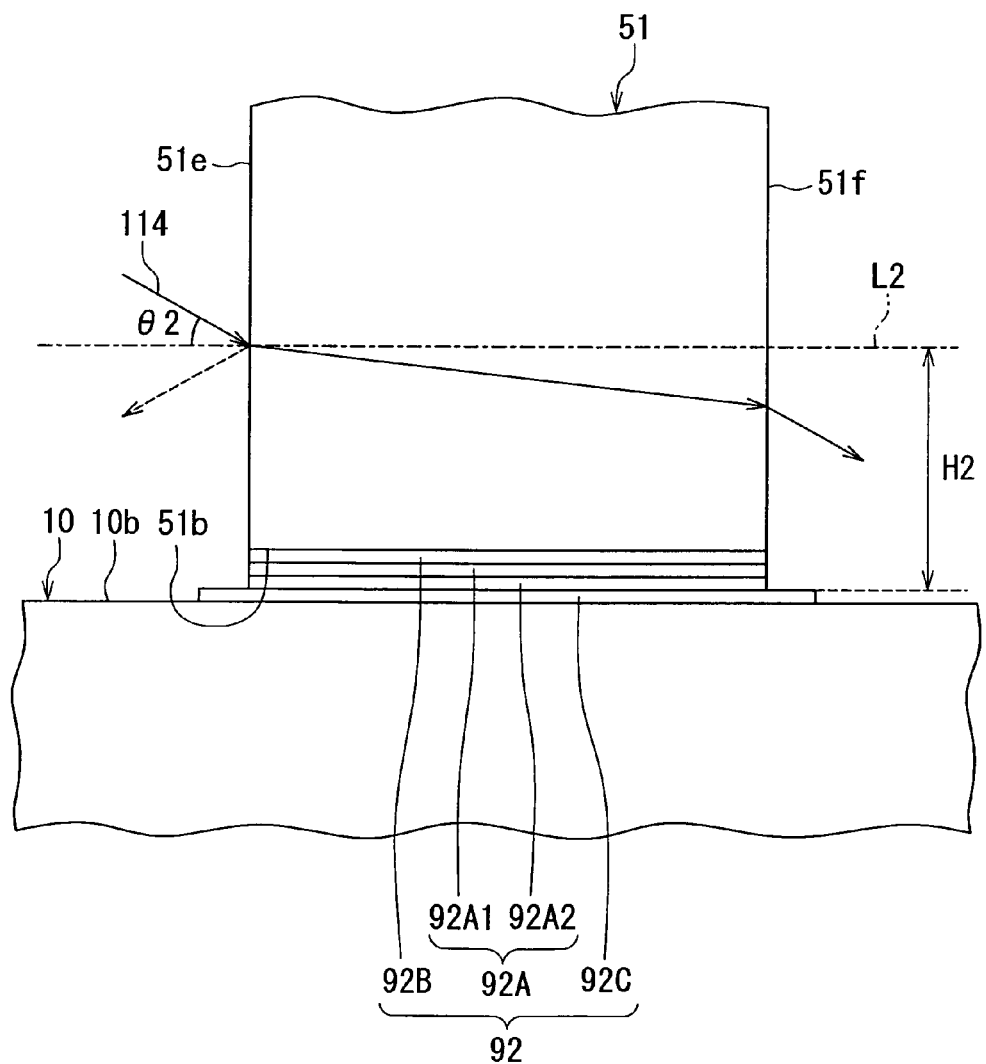
FIG. 17 is a cross-sectional view illustrating a second bonding step of a comparative example.

The second bonding step of the comparative example will now be described with reference to FIG. 17. FIG. 17 is a cross-sectional view illustrating the second bonding step of the comparative example. In the comparative example, with the preliminary bonding layer 92P interposed between the unit substrate 51 and the slider 10 before being bonded together, light 114 was projected to travel through the unit substrate 51 from the surface 51e to the surface 51f of the unit substrate 51. Further, while in this condition, light that is not illustrated was projected to travel through the unit substrate 51 from the surface 51f to the surface 51e of the unit substrate 51. Hereinafter, this non-illustrated light and the light 114 will be referred to as the heating light. In the comparative example, part of the heating light is absorbed by the unit substrate 51 and transformed into heat. The heat is conducted to the second bonding material included in the preliminary bonding layer 92P to melt the second bonding material. The melted second bonding material is then solidified to allow the unit substrate 51 and the slider 10 to be bonded together. The heating light was Nd-YAG laser light having a wavelength of 1064 nm.

Here, assume an imaginary straight line L2 passing through the position of incidence of the light 114 on the surface 51e and extending in a direction perpendicular to the surface 51e. As shown in FIG. 16, symbol H2 represents the distance from the surface of the second metal layer 92C to the imaginary straight line L2, while symbol $O_2$ represents the angle that the direction of travel of the light 114 immediately before being incident on the surface 51e forms with the imaginary straight line L2, that is, the incident angle of the light 114 to the surface 51e. The distance 112 was set to 100 μm and the angle θ2 was set to 30°. The position of incidence of the non-illustrated light on the surface 51f was made to coincide with the point of intersection of the surface 51f and the imaginary straight line L2. The direction of travel of the non-illustrated light immediately before being incident on the surface 51f was designed to form an angle equal to θ2 with the imaginary straight line L2.

For the comparative example, the conditions of the energy of the heating light and the irradiation time required to melt the second bonding material (the first layer 92A1 and the second layer 92A2) were determined and employed. Specifically, the energy of the heating light was set to 100 mJ and the irradiation time was set to 5 milliseconds.

The second bonding step of the first practical example will now be described. The second bonding step of the first practical example is the same as that of the first embodiment which has been described with reference to FIG. 12. For the first practical example, the light 112 (112e and 112f) was laser light having a wavelength of 1150 nm. The distance H1 shown in FIG. 12 was set to 70 μm, and the angle θ1 was set to 70°. Further, the position of incidence of the light 112f on the surface 51f was made to coincide with the point of intersection of the surface 51f and the imaginary straight line L1. The incident angle of the light 112f to the surface 51f was made equal to the angle θ1.

For the first practical example, as with the comparative example, the conditions of the energy of the light 112 and the irradiation time were determined and employed. Specifically, the energy of the light 112 was set to 1000 mJ and the irradiation time was set to 10 seconds.

The second bonding step of the second practical example will now be described. The second bonding step of the second practical example is the same as that of the second embodiment which has been described with reference to FIG. 16. For the second practical example, the light 112 (112e and 112f) was laser light having a wavelength of 1150 nm. The distance H1 shown in FIG. 16 was set to 70 μm, and the angle θ1 was set to 70°. Further, the position of incidence of the light 112f on the surface 51f was made to coincide with the point of intersection of the surface 51f and the imaginary straight line L1. The incident angle of the light 112f to the surface 51f was made equal to the angle θ1.

For the second practical example, as with the comparative example, the conditions of the energy of the light 112 and the irradiation time were determined and employed. Specifically, the energy of the light 112 was set to 300 mJ and the irradiation time was set to 0.6 second.

Table 1 shows the light absorption coefficient of Si, the material forming the unit substrate 51, and the light absorption coefficient of CIS, the material forming the light absorption layer 92D. Shown in Table 1 are the light absorption coefficients for the heating light employed for the comparative example, and for the light 112 having a wavelength of 1150 nm employed for the first and second practical examples. In addition to these light absorption coefficients, also shown in Table 1 are the light absorption coefficients for light having a wavelength of 1100 nm and for light having a wavelength of 1220 nm.

TABLE 1

| Wavelength (nm) | Light absorption coefficient of Si (cm$^{-1}$) | Light absorption coefficient of CIS (cm$^{-1}$) |
| --- | --- | --- |
| 1064 | 9.65 | $4.1 \times 10^4$ |
| 1100 | 3.57 | $3.8 \times 10^4$ |
| 1150 | 0.59 | $3.0 \times 10^4$ |
| 1220 | 0.15 | $4.6 \times 10^3$ |

Now, the experimental results will be described. For the comparative example, there was a change in the position of the laser diode 60 relative to the unit substrate 51 between before and after the unit substrate 51 and the slider 10 were bonded together. Further, during irradiation with the heating light, the temperature of the laser diode 60 was measured and found to be about 310° C. These results show that during irradiation with the heating light, the first bonding layer 91 reached at least 310° C. and the AuSn solder forming the first bonding material layer 91A of the first bonding layer 91 was melted. This is because in the unit substrate 51, the heat resulting from transformation of part of the heating light was conducted not only to the second bonding layer 92 but also to the first bonding layer 91 to cause the first bonding layer 91 to be excessively heated.

On the other hand, for the first and second practical examples, there was no change in the position of the laser diode 60 relative to the unit substrate 51 between before and after the unit substrate 51 and the slider 10 were bonded together. Further, during irradiation with the light 112, the temperature of the laser diode 60 was measured and found to be about 200° C. for the first practical example and about 90° C. for the second practical example. These results indicate that the present invention makes it possible to protect the first bonding material (AuSn solder) from melting in the second bonding step and to thereby prevent a change in the position of the laser diode 60 relative to the unit substrate 51.

Furthermore, for the second practical example, as described above, the second bonding material, i.e., Sn solder, was melted with less energy in a shorter irradiation time when compared with the first practical example. As can be seen from this result, the presence of the light absorption layer 92D allows the second bonding material to be heated more effectively with less energy in a shorter irradiation time. As a result, it is possible to reduce the amount of heat conducted to the first bonding layer 91 and to thereby prevent more effectively a change in the position of the laser diode 60 relative to the unit substrate 51.

The present invention is not limited to the foregoing embodiments, and various modifications may be made thereto. For example, the preliminary bonding layer 92P may be composed of one of the first layer 92A1 and the second layer 92A2. Further, the electronic device of the present invention is not limited to a thermally-assisted magnetic recording head, and may also be an optical pickup of an optical information read/write apparatus, or an optical communication device.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A method of manufacturing an electronic device, the electronic device including:
    an electronic component;
    a first member supporting the electronic component;
    a second member to which the first member is bonded;
    a first bonding layer bonding the electronic component and the first member together; and
    a second bonding layer bonding the first member and the second member together, wherein
    the first member has an outer surface, the outer surface including a first surface in contact with the first bonding layer, a second surface in contact with the second bonding layer, and a third surface in contact with neither of the first and second bonding layers,
    the first bonding layer includes a first bonding material layer made of a first bonding material that melts when heated to a first melting temperature or higher, and
    the second bonding layer includes a second bonding material layer made of a second bonding material that melts when heated to a second melting temperature or higher,
    the method comprising:
    a first bonding step of bonding the electronic component and the first member together via the first bonding layer; and
    a second bonding step of bonding the first member and the second member together via the second bonding layer after the first bonding step, wherein
    in the second bonding step, with a preliminary bonding layer interposed between the first member and the second member before being bonded together, the preliminary bonding layer including the second bonding material and being configured to later become the second bonding layer, the second bonding material included in the preliminary bonding layer is heated and melted by irradiation with light projected to travel through the first member from the third surface to the second surface, and thereafter the second bonding material is solidified so that the preliminary bonding layer becomes the second bonding layer,
    the first member is made of Si, and
    the light has a wavelength in the range of 1100 to 15000 nm.

2. The method of manufacturing the electronic device according to claim 1, wherein the second melting temperature is lower than the first melting temperature.

3. The method of manufacturing the electronic device according to claim 1, wherein the electronic component is a laser diode.

4. The method of manufacturing the electronic device according to claim 3, wherein
    the laser diode has a first emission part for emitting forward light and a second emission part for emitting backward light,
    the electronic device further includes a photodetector integrated with the first member, and
    the photodetector receives the backward light.

5. The method of manufacturing the electronic device according to claim 3, wherein the second member has a waveguide configured to allow emitted light from the laser diode to be incident thereon.

6. The method of manufacturing the electronic device according to claim 3, wherein the second member is a slider for thermally-assisted magnetic recording, the slider including:
    a medium facing surface facing a magnetic recording medium;
    a magnetic pole having an end face located in the medium facing surface and producing a write magnetic field for writing data on the magnetic recording medium;
    a waveguide through which light propagates; and
    a plasmon generator configured to excite a surface plasmon based on the light propagating through the waveguide and to generate near-field light from the medium facing surface based on the surface plasmon,
    the waveguide being configured to allow emitted light from the laser diode to be incident thereon.

7. A method of manufacturing an electronic device, the electronic device including:
    an electronic component;
    a first member supporting the electronic component;
    a second member to which the first member is bonded;
    a first bonding layer bonding the electronic component and the first member together; and
    a second bonding layer bonding the first member and the second member together, wherein
    the first member has an outer surface, the outer surface including a first surface in contact with the first bonding layer, a second surface in contact with the second bonding layer, and a third surface in contact with neither of the first and second bonding layers,
    the first bonding layer includes a first bonding material layer made of a first bonding material that melts when heated to a first melting temperature or higher,
    the second bonding layer includes a second bonding material layer made of a second bonding material that melts when heated to a second melting temperature or higher, and a light absorption layer interposed between the second surface and the second bonding material layer,
    the method comprising:
    a first bonding step of bonding the electronic component and the first member together via the first bonding layer; and
    a second bonding step of bonding the first member and the second member together via the second bonding layer after the first bonding step, wherein
    in the second bonding step, with a preliminary bonding layer interposed between the first member and the second member before being bonded together, the preliminary bonding layer including the light absorption layer and the second bonding material and being configured to later become the second bonding layer, the second bonding material included in the preliminary bonding layer is heated and melted by irradiation with light projected to travel through the first member from the third surface to the second surface, and thereafter the second bonding material is solidified so that the preliminary bonding layer becomes the second bonding layer, and
    the light absorption layer has a light absorption coefficient for the light higher than that of the first member.

8. The method of manufacturing the electronic device according to claim 7, wherein the second bonding layer further includes a metal layer interposed between the second bonding material layer and the light absorption layer.

9. The method of manufacturing the electronic device according to claim 7, wherein
the first member is made of Si, and
the light has a wavelength in the range of 1100 to 15000 nm.

10. The method of manufacturing the electronic device according to claim 7, wherein the light absorption coefficient of the light absorption layer for the light is $1\times10^3$ cm$^{-1}$ or more.

11. The method of manufacturing the electronic device according to claim 7, wherein the light absorption layer is made of a material containing Cu, In and Se.

12. The method of manufacturing the electronic device according to claim 7, wherein the second melting temperature is lower than the first melting temperature.

13. The method of manufacturing the electronic device according to claim 7, wherein the electronic component is a laser diode.

14. The method of manufacturing the electronic device according to claim 13, wherein
the laser diode has a first emission part for emitting forward light and a second emission part for emitting backward light,
the electronic device further includes a photodetector integrated with the first member, and
the photodetector receives the backward light.

15. The method of manufacturing the electronic device according to claim 13, wherein the second member has a waveguide configured to allow emitted light from the laser diode to be incident thereon.

16. The method of manufacturing the electronic device according to claim 13, wherein the second member is a slider for thermally-assisted magnetic recording, the slider including:
a medium facing surface facing a magnetic recording medium;
a magnetic pole having an end face located in the medium facing surface and producing a write magnetic field for writing data on the magnetic recording medium;
a waveguide through which light propagates; and
a plasmon generator configured to excite a surface plasmon based on the light propagating through the waveguide and to generate near-field light from the medium facing surface based on the surface plasmon,
the waveguide being configured to allow emitted light from the laser diode to be incident thereon.

17. An electronic device comprising:
an electronic component;
a first member supporting the electronic component;
a second member to which the first member is bonded;
a first bonding layer bonding the electronic component and the first member together; and
a second bonding layer bonding the first member and the second member together, wherein
the first member has an outer surface, the outer surface including a first surface in contact with the first bonding layer, a second surface in contact with the second bonding layer, and a third surface in contact with neither of the first and second bonding layers,
the first bonding layer includes a first bonding material layer made of a first bonding material that melts when heated to a first melting temperature or higher,
the second bonding layer includes a second bonding material layer made of a second bonding material that melts when heated to a second melting temperature or higher, and a light absorption layer interposed between the second surface and the second bonding material layer and absorbing light, and
the light absorption layer has a light absorption coefficient higher than that of the first member for light having a wavelength in the range of 1100 to 1220 nm.

18. The electronic device according to claim 17, wherein the second bonding layer further includes a metal layer interposed between the second bonding material layer and the light absorption layer.

19. The electronic device according to claim 17, wherein the first member is made of Si.

20. The electronic device according to claim 17, wherein the light absorption coefficient of the light absorption layer is $1\times10^3$ cm$^{-1}$ or more.

21. The electronic device according to claim 17, wherein the light absorption layer is made of a material containing Cu, In and Se.

22. The electronic device according to claim 17, wherein the second melting temperature is lower than the first melting temperature.

23. The electronic device according to claim 17, wherein the electronic component is a laser diode.

24. The electronic device according to claim 23, wherein the laser diode has a first emission part for emitting forward light and a second emission part for emitting backward light,
the electronic device further comprising a photodetector integrated with the first member,
the photodetector receiving the backward light.

25. The electronic device according to claim 23, wherein the second member has a waveguide configured to allow emitted light from the laser diode to be incident thereon.

26. The electronic device according to claim 23, wherein the second member is a slider for thermally-assisted magnetic recording, the slider including:
a medium facing surface facing a magnetic recording medium;
a magnetic pole having an end face located in the medium facing surface and producing a write magnetic field for writing data on the magnetic recording medium;
a waveguide through which light propagates; and
a plasmon generator configured to excite a surface plasmon based on the light propagating through the waveguide and to generate near-field light from the medium facing surface based on the surface plasmon,
the waveguide being configured to allow emitted light from the laser diode to be incident thereon.

* * * * *